(12) United States Patent
Kang et al.

(10) Patent No.: US 11,032,045 B2
(45) Date of Patent: Jun. 8, 2021

(54) METHOD FOR MEASURING AND REPORTING CHANNEL STATE INFORMATION IN WIRELESS COMMUNICATION SYSTEM AND DEVICE THEREFOR

(71) Applicant: LG Electronics Inc., Seoul (KR)

(72) Inventors: Jiwon Kang, Seoul (KR); Kijun Kim, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 6 days.

(21) Appl. No.: 16/483,374

(22) PCT Filed: Jan. 31, 2018

(86) PCT No.: PCT/KR2018/001331
§ 371 (c)(1),
(2) Date: Aug. 2, 2019

(87) PCT Pub. No.: WO2018/143665
PCT Pub. Date: Aug. 9, 2018

(65) Prior Publication Data
US 2019/0379503 A1    Dec. 12, 2019

Related U.S. Application Data

(60) Provisional application No. 62/454,116, filed on Feb. 3, 2017.

(51) Int. Cl.
*H04L 5/00* (2006.01)
*H04W 24/10* (2009.01)
*H04W 72/04* (2009.01)

(52) U.S. Cl.
CPC .......... *H04L 5/0048* (2013.01); *H04W 24/10* (2013.01); *H04W 72/042* (2013.01)

(58) Field of Classification Search
CPC .................................................. H04L 5/0048
See application file for complete search history.

(56) References Cited

U.S. PATENT DOCUMENTS

2017/0302419 A1* 10/2017 Liu ................... H04W 48/12
2017/0366377 A1* 12/2017 Papasakellariou ..........................
                                                H04L 27/2613
2018/0241523 A1*  8/2018 Noh ................... H04W 24/10

FOREIGN PATENT DOCUMENTS

KR    1020150035760    4/2015

OTHER PUBLICATIONS

Huawei, HiSilicon, "On the need for more flexible configurations related to CSI reporting," R1-1611237, 3GPP TSG RAN WG1 Meeting #87, Reno, USA, dated Nov. 5, 2016, 8 pages.

(Continued)

*Primary Examiner* — Kevin M Cunningham
(74) *Attorney, Agent, or Firm* — Fish & Richardson P.C.

(57) ABSTRACT

This specification provides a method for measuring and reporting channel state information in a wireless communication system.

Specifically, a method for reporting, by a user equipment, channel state information (CSI) in a wireless communication system includes: receiving CSI configuration information related to a CSI reporting procedure; receiving one or more channel state information (CSI)-reference signals (CSI-RSs); and reporting the CSI determined by measurement values estimated by the one or more CSI-RSs, in which first triggering for transmission of the one or more CSI-RSs and second triggering for reporting of the CSI may be indicated through downlink control information.

13 Claims, 14 Drawing Sheets

(56) References Cited

OTHER PUBLICATIONS

Huawei, HiSilicon, "Csi measurement and reporting for coordinated transmission scheme," R1-1611674, 3GPP TSG RAN WG1 Meeting #87, Reno, USA, dated Nov. 5, 2016, 7 pages.
LG Electronics, "Discussion on CSI measurement framework," R1-?1611822, 3GPP TSG RAN WG1 Meeting #87, Reno, USA, dated Nov. 5, 2016, 8 pages.
Ericsson, "On CSI measurements and reporting," R1-1612349, on Csi measurements and reporting, 3GPP TSG-RAN WG1 #87, Reno, Nevada, dated Nov. 5, 2016, 6 pages.
Ericsson, "On Dynamic Signalling for Aperiodic and Semi-Persistent CSI-RS," R1-1700761, 3GPP TSG-RAN WG1 #87ah-NR, Spokane, WA, USA, Jan. 16-20, 2017, 6 pages.
Extended European Search Report in European Appln. No. 18748425.8, dated Nov. 2, 2020, 13 pages.
Intel Corporation, "Discussion on NR CSI configuration," R1-1611984, 3GPP TSG-RAN WG1 #87, Reno, USA, Nov. 14-18, 2016, 5 pages.

\* cited by examiner (a)

TRIGGERING DCI (1002)

a) | | CSI-RS Tirg Info | CSI REPORTING Tirg Info | | b) | | Flag | CSI-RS Tirg Info/ CSI REPORTING Tirg Info | c)
| | CSI-RS Tirg Info | |
| | CSI REPORTING Tirg Info | |

METHOD FOR MEASURING AND REPORTING CHANNEL STATE INFORMATION IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2018/001331, filed on Jan. 31, 2018, which claims the benefit of U.S. Provisional Application No. 62/454,116, filed on Feb. 3, 2017, the contents of which are hereby incorporated by reference herein in its entirety.

TECHNICAL FIELD

The present invention relates to a wireless communication system, and more particularly, to a method for measuring and reporting channel state information (CSI) and a device for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

This specification proposes a method for measuring and reporting channel state information (CSI) by a UE.

In this regard, this specification proposes a method for dynamically performing independent CSI report triggering and CSI-RS triggering.

Further, this specification proposes a method for designing downlink control information for independent CSI report triggering and CSI-RS triggering.

In addition, this specification proposes a method for dynamically transferring information for on/off for a link included in a CSI measurement configuration or swapping for a purpose.

The technical objects of the present invention are not limited to the aforementioned technical objects, and other technical objects, which are not mentioned above, will be apparently appreciated by a person having ordinary skill in the art from the following description.

Technical Solution

According to an embodiment of the present invention, a method for reporting, by a user equipment, channel state information (CSI) in a wireless communication system includes: receiving CSI configuration information related to a CSI reporting procedure, wherein the CSI configuration information includes information representing measurement setting for the CSI, information representing reporting setting for the CSI, and information representing resource setting for the CSI; receiving one or more channel state information (CSI)-reference signals (CSI-RSs) based on the information representing the resource setting; and reporting the CSI determined by measurement values estimated by the one or more CSI-RSs, based on the information representing the measurement setting and the information representing the reporting setting, in which first triggering for transmission of the one or more CSI-RSs and second triggering for reporting of the CSI may be indicated through downlink control information.

Furthermore, in the method according to the embodiment of the present invention, the first triggering and the second triggering may be simultaneously indicated for the UE.

Furthermore, in the method according to the embodiment of the present invention, the first triggering and the second triggering may be indicated for the UE in the same slot.

Furthermore, in the method according to the embodiment of the present invention, the first triggering and the second triggering may be indicated through specific downlink control information, and the specific downlink control information may include a first field for the first triggering and a second field for the second triggering.

Furthermore, in the method according to the embodiment of the present invention, the first field may indicate indexes for one or more CSI-RS resources related to the first triggering, and the second field may indicate indexes for one or more CSI-RS reporting settings related to the second triggering.

Furthermore, in the method according to the embodiment of the present invention, the first triggering and the second triggering may be indicated through specific downlink control information, the specific downlink control information may include flag information indicating the first triggering or the second triggering, and the indexes for one or more CSI-RS resources related to the first triggering or the indexes for one or more CSI reporting settings related to the second triggering may be indicated in a common field included in the specific downlink control information.

Furthermore, in the method according to the embodiment of the present invention, the flag information may further indicate whether joint triggering between the first triggering and the second triggering is performed.

Furthermore, in the method according to the embodiment of the present invention, indication information indicating the indexes for one or more CSI-RS resources related to the first triggering and the indexes for one or more CSI reporting settings related to the second triggering may be configured to be indicated in the common field.

Furthermore, in the method according to the embodiment of the present invention, the first triggering may be indicated through first downlink control information including the first field for the first triggering, and the second triggering may be indicated through second downlink control information including the second field for the second triggering.

Furthermore, in the method according to the embodiment of the present invention, the one or more CSI-RSs may be received through one or more CSI-RSs which belong to at least one CSI-RS resource setting included in the information representing the resource setting, and the CSI may be reported through one or more CSI reporting settings in CSI measurement setting included in the information representing the measurement setting.

Furthermore, in the method according to the embodiment of the present invention, when multiple CSI-RS resource settings are preconfigured as multiple links for the one or more CIS reporting settings, information representing ON or OFF for at least one link among the multiple links may be indicated together with the second triggering.

Furthermore, in the method according to the embodiment of the present invention, the information representing the measurement setting may further include information indicating a use of the at least one CSI-RS resource setting, and the use of the at least one CSI-RS resource setting may be one of channel measurement, interference measurement, or rate matching.

Furthermore, in the method according to the embodiment of the present invention, the information representing the measurement setting may further include swapping information changing the use of the at least one CSI-RS resource setting, and the use of the at least one CSI-RS resource setting may be one of the channel measurement, the interference measurement, or the rate matching.

Furthermore, in the method according to the embodiment of the present invention, the one or more CSI-RSs may be configured to be aperiodically transmitted, and the CSI may be configured to be aperiodically reported.

According to an embodiment of the present invention, A UE reporting channel state information (CSI) in a wireless communication system may include: a radio frequency (RF) module for transmitting and receiving a radio signal; and a processor functionally connected with the RF module, in which the processor may control to receive CSI configuration information related to a CSI reporting procedure, wherein the CSI configuration information includes information representing measurement setting for the CSI, information representing reporting setting for the CSI, and information representing resource setting for the CSI, receive one or more channel state information (CSI)-reference signals (CSI-RSs) based on the information representing the resource setting, and report the CSI determined by measurement values estimated by the one or more CSI-RSs, based on the information representing the measurement setting and the information representing the reporting setting, and in which first triggering for transmission of the one or more CSI-RSs and second triggering for reporting of the CSI may be indicated through downlink control information.

Advantageous Effects

According to an embodiment of the present invention, as triggering for CSI reporting setting and CSI-RS resource setting is independently performed, a UE can more flexibly CSI measurement and reporting.

Advantages which may be obtained in the present invention are not limited to the aforementioned effects and other unmentioned advantages will be clearly understood by those skilled in the art from the following description.

DESCRIPTION OF DRAWINGS

The accompanying drawings, which are included herein as a part of a description in order to help understanding of the present disclosure, provide embodiments of the present disclosure, and describe the technical features of the present disclosure with the description below.

FIG. 11 illustrates examples of a triggering DCI structure to which a method proposed in this specification may be applied.

MODE FOR INVENTION

Figure 1:
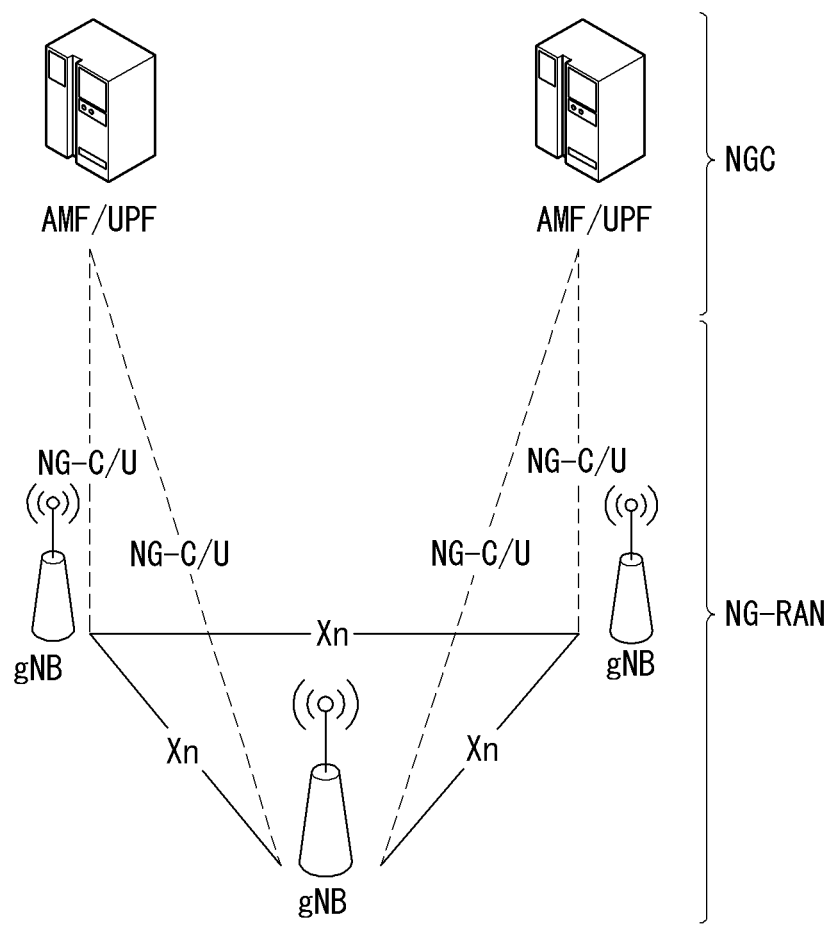
FIG. 1 illustrates an example of an overall structure of a new radio (NR) system to which a method proposed by the present disclosure may be implemented.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In this specification, a base station has a meaning as a terminal node of a network that directly communicates with a terminal. In this document, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A 'base station (BS)' may be replaced with terms including a fixed station, a Node B, an evolved-NodeB (eNB), a base transceiver system (BTS), an access point (AP), a next generation NB, general NB, gNodeB (gNB), and the like. Further, a 'terminal' may be fixed or mobile and may be replaced with terms including a mobile station (UE), a mobile station (MS), a user terminal (UT), a mobile subscriber station (MSS), a subscriber station (SS) Advanced Mobile Station (WT), a Wireless Terminal (WT), a Machine-Type Communication (MTC) device, a Machine-to-Machine (M2M) device, and a Device-to-Device (D2D) device, and the like.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT (NR) is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface.

Overview of System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or/I). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB. Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
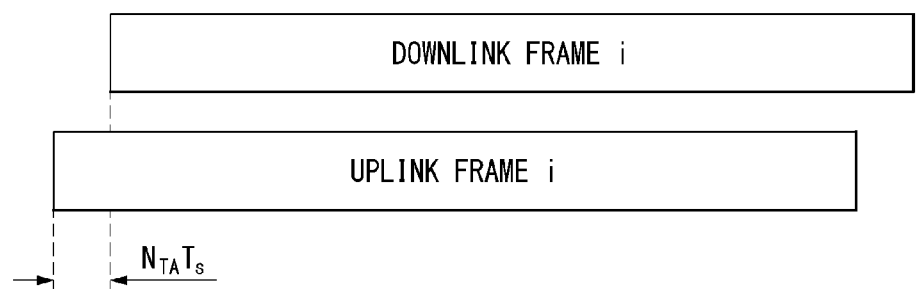
FIG. 2 illustrates a relationship between a uplink (UL) frame and a downlink (DL) frame in a wireless communication system to which a method proposed by the present disclosure may be implemented.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology µ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{subframe}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology µ, and Table 3 shows the number of OFDM symbols per slot for an extended CP in the numerology µ.

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted may be inferred from another channel over which a symbol on the same antenna port is transmitted. When large-scale properties of a channel received over which a symbol on one antenna port may be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
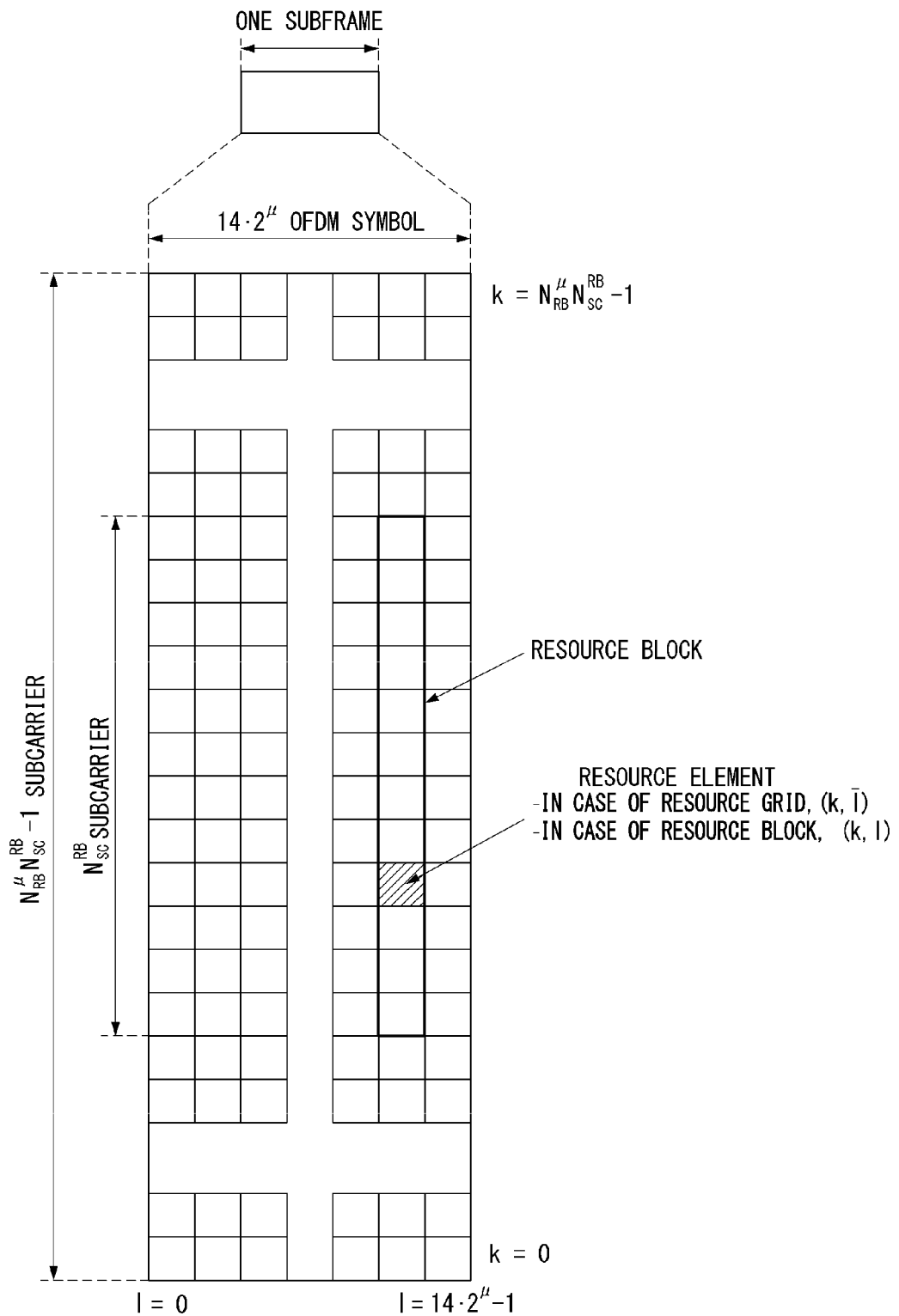
FIG. 3 illustrates an example of a resource grid supported in a wireless communication system to which a method proposed by the present disclosure may be implemented.

FIG. 3 illustrates an example of a resource grid supported in a wireless communication system to which a method proposed by the present disclosure may be implemented.

Referring to FIG. 3, a resource grid is composed of $N_{RB}^\mu N_{sc}^{RB}$ carriers in a frequency domain, each subframe composed of 14·2µ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols. Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

Figure 4:
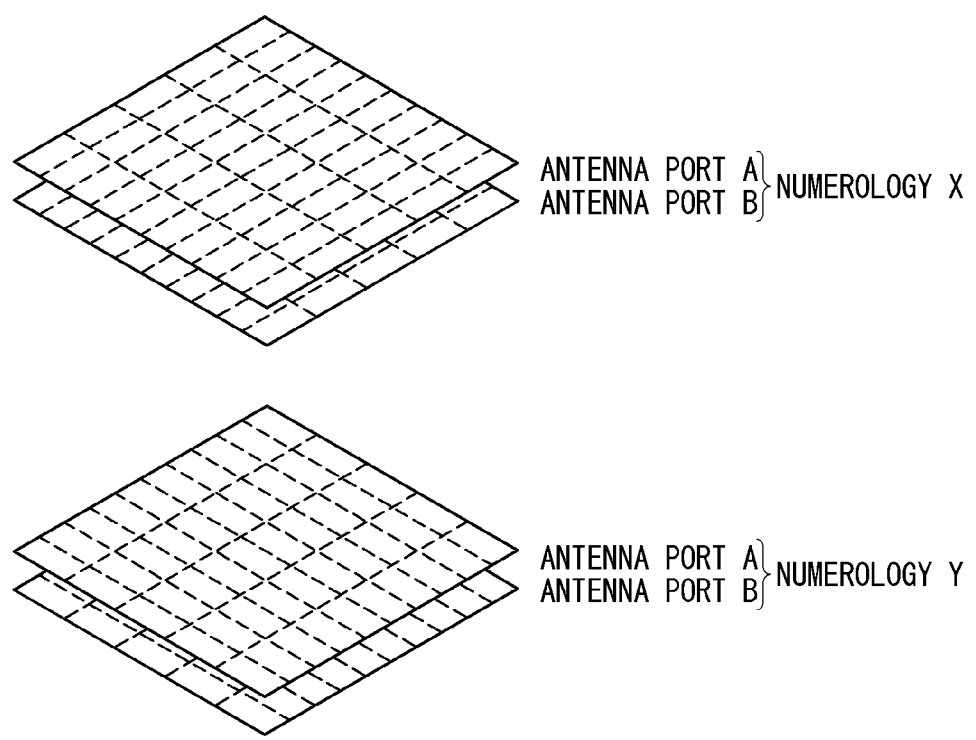
FIG. 4 illustrates examples of resource grids for each antenna port and numerology to which a method proposed in this specification may be applied.

In this case, as illustrated in FIG. 4, one resource grid may be configured for the numerology µ and an antenna port p.

FIG. 4 shows an example of antenna ports and ringer-specific resource grids to which the method proposed herein may be applied.

TABLE 2

| | | | | Slot configuration | | | |
|---|---|---|---|---|---|---|---|
| | | 0 | | | 1 | | |
| µ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | | | Slot configuration | | | |
|---|---|---|---|---|---|---|---|
| | | 0 | | | 1 | | |
| µ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

Each element of the resource grid for the numerology µ and the antenna port p is indicated as a resource element, and may be uniquely identified by an index pair (k, ī). Herein, $k=0, \ldots, N_{RB}^{\mu} N_{sc}^{RB}-1$ is an index in the frequency domain, and $\bar{l}=0, \ldots, 2^{\mu} N_{symb}^{(\mu)}-1$ indicates a location of a symbol in a subframe. To indicate a resource element in a slot, the index pair (k,ī) is used. Herein $l=0, \ldots, N_{symb}^{\mu}-1$.

The resource element (k,ī) for the numerology µ and the antenna port p corresponds to a complex value $a_{k,\bar{l}}^{(p,\mu)}$. When there is no risk of confusion or when a specific antenna port or numerology is specified, the indexes p and µ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Beam Management

In NR, beam management is defined as follows.

Beam management: A set of L1/L2 procedures for obtaining and maintaining a set of TRP(s) and/or UE beams that may be used for DL and UL transmission/reception, including at least:

Beam determination: operation of the TRP(s) or the UE selecting transmission/reception beam thereof.

Beam measurement: operation of the TRP(s) or the UE selecting transmission/reception beam thereof.

Beam reporting: operation in which the UE reports information of a beamformed signal based on beam measurement.

Beam sweeping: operation of covering a spatial region using a transmitted and/or received beam for a time interval in a predetermined scheme.

Further, Tx/Rx beam correspondence in the TRP and the UE is defined as follows:

The Tx/Rx beam correspondence in the TRP is maintained if at least one of the followings is satisfied:

The TRP may determine a TRP reception beam for uplink reception based on the UE's downlink measurement for one or more transmission beams of the TRP.

The TRP may determine a TRP Tx beam for downlink reception based on uplink measurement of the TRP for one or more Rx beams of the TRP.

The Tx/Rx beam correspondence in the UE is maintained if at least one of the followings is satisfied:

The UE may determine a UE Tx beam for uplink transmission based on downlink measurement of the UE for one or more Rx beams of the UE.

The UE may determine a UE reception beam for downlink reception based on an instruction of the TRP based on uplink measurement for one or more Tx beams.

A capability indication of UE beam correspondence related information is supported to the TRP.

The following DL L1/L2 beam management procedures are supported within one or more TRPs.

P-1: Used to enable UE measurement for different TRP Tx beams to support selection of TRP Tx beam/UE Rx beam(s).

For beamforming in the TRP, P-1 generally includes intra-TRP/inter-TRP Tx beam sweeps from a set of different beams. For beamforming in the UE, P-1 typically includes a UE Rx beam sweep from a set of different beams.

P-2: Used to allow UE measurements for different TRP Tx beams to change inter/intra-TRP Tx beam(s).

P-3: UE measurement for the same TRP Tx beam is used to change the UE Rx beam when the UE uses beamforming.

Aperiodic reporting triggered by the network is at least supported in P-1, P-2, and P-3 related operations.

The UE measurement based on RS for beam management (at least CSI-RS) is constituted by K (total number of beams) beams and the UE reports the measurement results of N selected Tx beams. Here, N is not particularly a fixed number. Procedures based on RS for mobility purposes are not excluded. Reporting information at least includes a measurement quantity for N beam(s) if N<K and information indicating N DL transmission beams. In particular, for UEs with K'>1 non-zero-power (NZP) CSI-RS resources, the UE may report N' CRIs (CSI-RS resource indicators).

The UE may be set as the following higher layer parameters for beam management.

N≥1 reporting setting and M≥1 resource setting

Links between reporting settings and resource settings are set in agreed CSI measurement settings.

CSI-RS-based P-1 and P-2 are supported with the resource and reporting settings.

P-3 may be supported with or without the reporting settings.

Reporting setting that includes at least:

Information indicating the selected beam

L1 measurement reporting time domain operation (e.g., aperiodic operation, periodic operation, semi-persistent operation)

frequency granularity when multiple frequency granularities are supported

Resource setting that includes at least:

time domain operation (e.g., aperiodic operation, periodic operation, semi-persistent operation)

RS type: at least NZP CSI-RS at least one CSI-RS resource set. Each CSI-RS resource set includes K≥1 CSI-RS resources (Some parameters of K CSI-RS resources may be the same. For example, port number, a time domain operation, density, and periodicity).

Further, NR supports a next beam report considering L group with L>1.

Information indicating minimal groups

Measurement quantity (L1 RSRP and CSI reporting support (when the CSI-RS is for CSI acquisition)) for N1 beam If applicable, information indicating N1 DL transmission beams The group-based beam reporting as described above may be configured on a UE-by-UE basis. Further, the group-based beam reporting may be turned off on the UE-by-UE basis (e.g., when L=1 or NI=1).

NR supports that UE may trigger a mechanism which the UE recovers from the beam failure.

A beam failure event occurs when a quality of a beam pair link of an associated control channel is sufficiently low (e.g., a comparison with a threshold, a timeout of an associated timer). The mechanism recovered from the beam failure is triggered when the beam failure occurs.

The network explicitly configures in the UE with resources for transmission of UL signals for recovery purpose. Configurations of the resources are supported where the base station is listening from all or some directions (e.g., random access region).

The UL transmission/resource reporting the beam failure may be located at the same time instance as the PRACH (the resource orthogonal to the PRACH resource) or at a difference time instance (configurable for the UE) from the PRACH. The transmission of the DL signal is supported so that the UE may monitor the beam to identify new potential beams.

The NR supports the beam management regardless of a beam-related indication. When the beam related indication is provided, information regarding a UE side beamforming/receiving procedure used for CIS-RS based measurement may be indicated to the UE through the QCL. As QCL parameters to be supported by the NR, parameters for delay, Doppler, average gain, etc. used in the LTE system and a spatial parameter for beamforming at a receiver is scheduled to be added and the QCL parameter may include angle of arrival related parameters in terms of UE reception beamforming and/or angle of departure related parameters in terms of base station reception beamforming. The NR supports the use of the same or different beams in the control channel and the corresponding data channel transmission.

For NR-PDCCH transmissions supporting robustness to beam pair link blocking, the UE may be configured to simultaneously monitor NR-PDCCH on M beam-pair links. Here, M≥1 and a maximum value of M may depend on at least a UE capability.

The UE may be configured to monitor the NR-PDCCH on different beam-pair link(s) in different NR-PDCCH OFDM symbols. Parameters related to a UE Rx beam configuration for monitoring the NR-PDCCH on multiple beam-pair links are configured by higher layer signaling or MAC CE and/or considered in a search space design.

At least, the NR supports an indication of a spatial QCL assumption between DL RS antenna port(s) and DL RS antenna port(s) for demodulation of the DL control channel. A candidate signaling method for a beam indication for the NR-PDCCH (i.e., a configuration method for monitoring the NR-PDCCH) includes MAC CE signaling, RRC signaling, DCI signaling, specification transparent and/or implicit methods, and combinations of the signaling methods.

For reception of a unicast DL data channel, the NR supports the indication of the spatial QCL assumption between the DL RS antenna port and the DMRS antenna port of the DL data channel.

Information indicating the RS antenna port is indicated via DCI (downlink grant). Further, the information also indicates the RS antenna port QCLed with the DMRS antenna port. A different set of DMRS antenna ports for a DL data channel may be represented as a different set of RS antenna ports and a QCL.

Hereinafter, prior to describing the methods proposed in this specification in detail, contents directly or indirectly related to the methods proposed in this specification will be briefly described first.

In next-generation communication including 5G, New Rat (NR), etc., as more and more communication devices require a larger communication capacity, there is a need for enhanced mobile broadband communication as compared with the existing radio access technology.

Further, massive machine type communications (MTCs), which provide various services anytime and anywhere by connecting many devices and objects, are one of the major issues to be considered in the next generation communication.

In addition, a communication system design or structure considering a service/UE sensitive to reliability and latency is being discussed.

The introduction of next generation radio access technology (RAT) considering enhanced mobile broadband communication (eMBB), massive MTC (mMTC), ultra-reliable and low latency communication (URLLC) is currently discussed, and in this specification, the technology is called 'new RAT (NR)' for convenience.

Self-Contained Slot Structure

Figure 5:
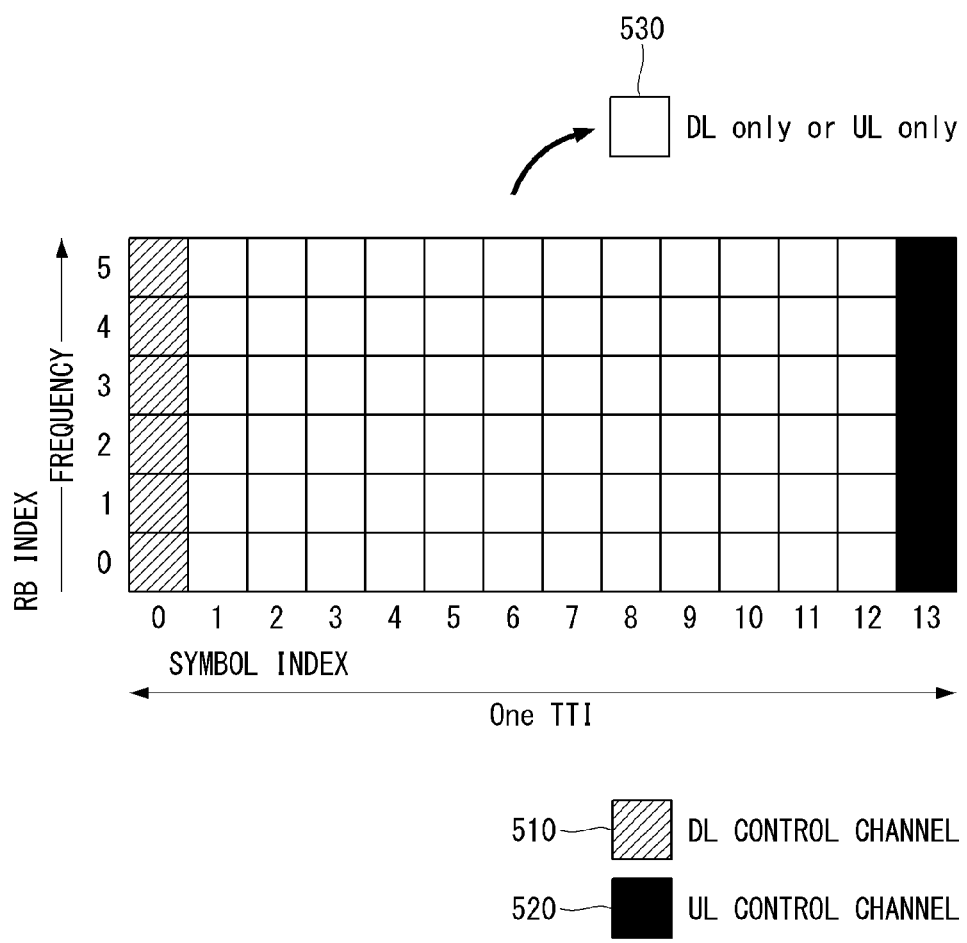
FIG. 5 is a diagram illustrating one example of a self-contained slot structure to which the method proposed in the present specification may be applied.

In order to minimize the latency of data transmission in a TDD system, the fifth generation new RAT considers a self-contained slot structure as shown in FIG. 5.

That is, FIG. 5 is a diagram illustrating one example of a self-contained slot structure to which the method proposed in this specification may be applied.

In FIG. 5, a dashed area 510 indicates a downlink control area and a black area 520 indicates an uplink control area.

An unmarked area 530 may be used for downlink data transmission or for uplink data transmission.

Such a structure may be characterized in that DL transmission and UL transmission are sequentially performed in one slot, and DL data may be transmitted in one slot, and UL ACK/NACK may also be transmitted and received.

Such a slot may be defined as a 'self-contained slot'.

That is, through such a slot structure, it takes less time for the eNB to retransmit data to the UE when a data transmission error occurs, thereby minimizing the latency of final data transmission.

In such a self-contained slot structure, there is a need for a time gap between the eNB and the UE for the conversion process from the transmission mode to the reception mode or from the reception mode to the transmission mode.

To this end, some OFDM symbols at the time of switching from DL to UL in the slot structure are configured to a guard period (GP).

Analog Beamforming

In the millimeter wave (mmW), the wavelength is shortened, so that a plurality of antenna elements may be installed in the same area.

That is, a total of 64 (8×8) antenna elements may be installed in a 2-dimension array at a 0.5 lambda (wavelength) interval on a panel of 4×4 cm with a wavelength of 1 cm in a 30 GHz band.

Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource.

However, when the TXRUs are installed on all of approximately 100 antenna elements, there is a problem that effectiveness is deteriorated in terms of costs.

Therefore, a method of mapping a plurality of antenna elements to one TXRU and adjusting a direction of a beam using an analog phase shifter is considered.

Such an analog beamforming method has a disadvantage in that frequency selective beamforming may not be performed by making only one beam direction in all bands.

A hybrid BF (HBF) with B TXRUs, which is an intermediate form of digital BF and analog BF, and fewer than Q antenna elements, may be considered.

In the HBF, although there is a difference depending on a connection method of B TXRUs and Q antenna elements, the number of directions of the beams that may be transmitted at the same time is limited to B or less.

Figure 6:
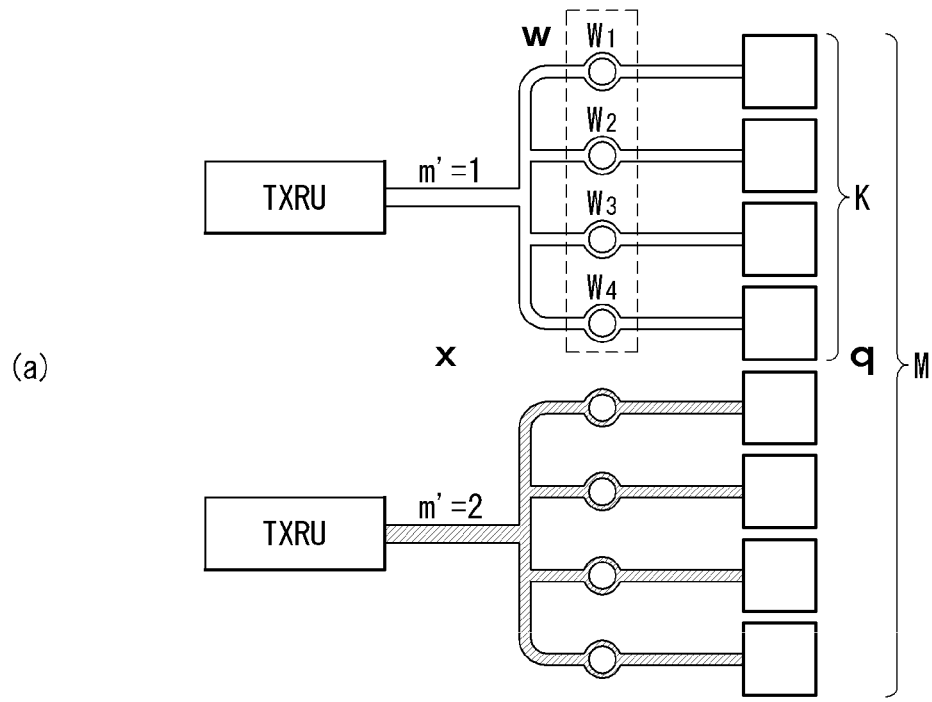
FIG. 6 illustrates examples of a connection scheme of a TXRU and an antenna element to which a method proposed in this specification may be applied.
Figure 6:
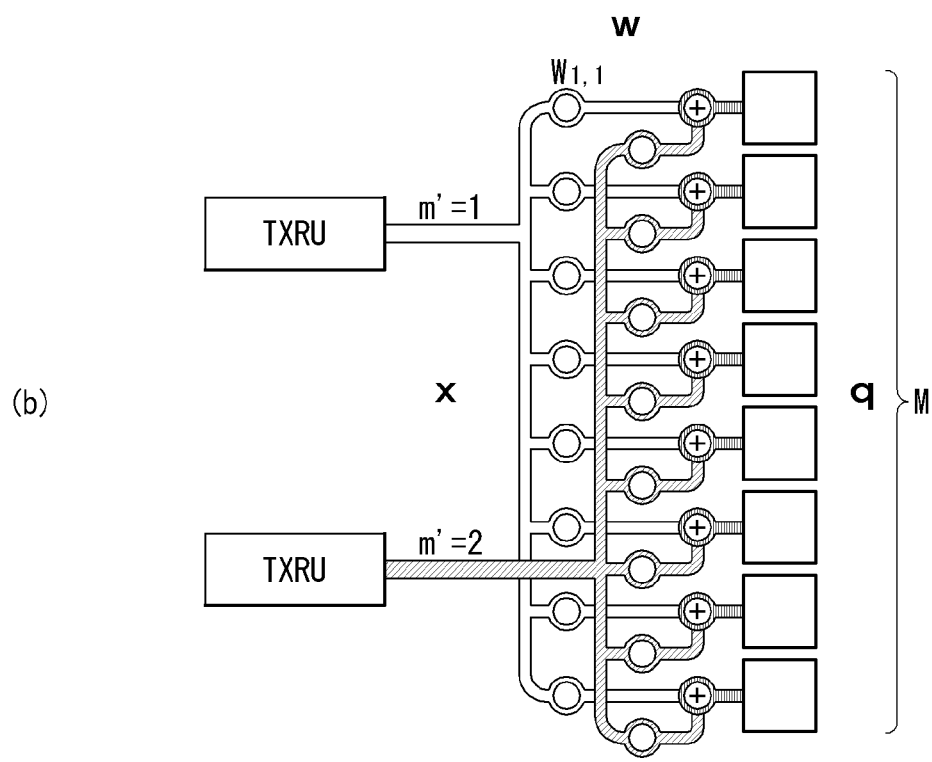

FIG. 6 illustrates examples of a connection scheme of a TXRU and an antenna element to which a method proposed in this specification may be applied.

Here, a TXRU virtualization model shows a relationship between an output signal of the TXRUs and an output signal of the antenna elements.

FIG. 6(a) illustrates an example of a scheme in which the TXRU is connected to a sub-array.

Referring to FIG. 6(a), the antenna element is connected only to one TXRU. Unlike FIG. 6(a), FIG. 6(b) illustrates a scheme in which the TXRU is connected to all antenna elements.

That is, in the case of FIG. 6(b), the antenna element is connected to all TXRUs.

In FIG. 6, W represents a phase vector multiplied by an analog phase shifter.

In other words, a direction of analog beamforming is determined by W. Here, mapping of CSI-RS antenna ports and TXRUs may be 1-to-1 or 1-to-many.

CSI Feedback

In a 3GPP LTE/LTE-A system, user equipment (UE) is defined to report channel state information (CSI) to a base station (BS).

Here, the channel state information (CSI) collectively refers to information that may indicate the quality of a radio channel (or also referred to as a link) formed between the UE and the antenna port.

For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI.

The PMI is a value reflecting a channel space characteristic and represents a preferred precoding index preferred by the UE based on a metric such as SINR.

The CQI is a value representing the strength of the channel, and generally refers to a reception SINR that may be obtained when the BS uses the PMI.

In the 3GPP LTE/LTE-A system, the BS configures a plurality of CSI processes to the UE and may receive CSI for each process.

Here, the CSI process is constituted by a CSI-RS for signal quality measurement from the BS and a CSI-interference measurement (CSI-IM) resource for interference measurement.

Reference Signal (RS) Virtualization

In the mmW, it is possible to transmit a PDSCH only in one analog beam direction at a time by analog beamforming.

Therefore, the eNB transmits data only to a small number of some UEs in a specific direction.

Therefore, if necessary, the analog beam direction is differently configured for each antenna port so that data transmission may be simultaneously performed to a plurality of UEs in several analog beam directions.

Figure 7:
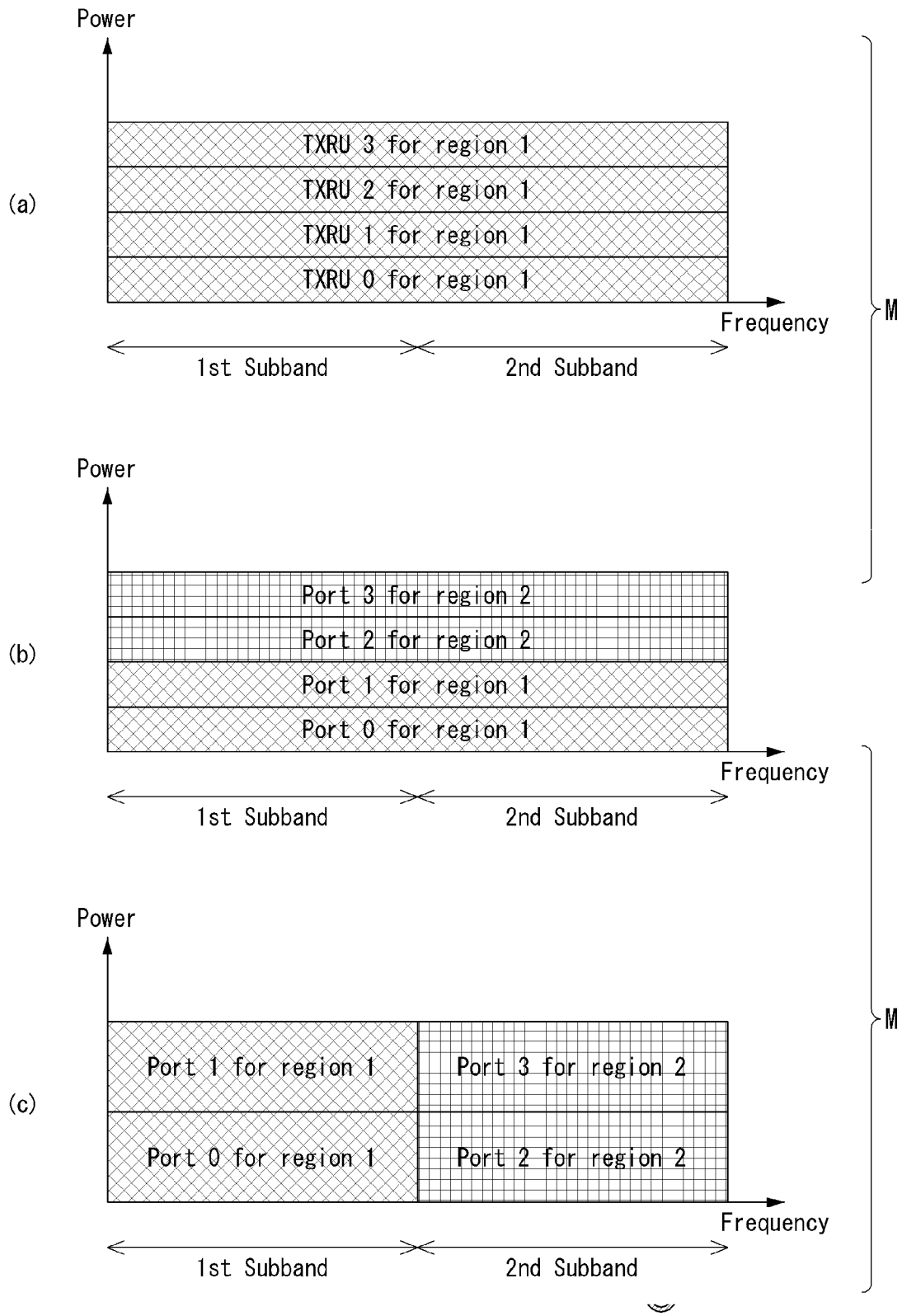
FIG. 7 illustrates various examples of a service area for TXRU to which a method proposed in this specification may be applied.

FIG. 7 illustrates various examples of a service area for TXRU to which a method proposed in this specification may be applied.

In FIG. 7, 256 antenna elements are divided into 4 parts to form 4 sub-arrays, and the structure of connecting the TXRU to each sub-array will be described as an example.

When each sub-array is constituted by a total of 64 (8×8) antenna elements in the form of a 2-dimensional array, specific analog beamforming may cover an area corresponding to a 15-degree horizontal angle area and a 15-degree vertical angle area.

That is, the zone where the eNB should be served is divided into a plurality of areas, and services are provided one by one at a time.

In the following description, it is assumed that the CSI-RS antenna ports and the TXRUs are 1-to-1 mapped.

Therefore, it may be interpreted that the antenna port and the TXRU have the same meaning as the following description.

If all TXRUs (antenna ports, sub-arrays) have the same analog beamforming direction as illustrated in FIG. 7(a), the throughput of the corresponding zone may be increased by forming digital beam with higher resolution.

Further, it is possible to increase the throughput of the corresponding zone by increasing the RANK of the transmission data to the corresponding zone.

In addition, as illustrated in FIG. 7(b), if each TXRU (antenna port, sub-array) has a different analog beamforming direction, the data may be transmitted simultaneously to UEs distributed in a wider area in the subframe (SF).

As illustrated in FIG. 7(b), two of four antenna ports are used for PDSCH transmission to UE1 in region 1 and the remaining two antenna ports are used for PDSCH transmission to UE2 in Area 2.

Further, FIG. 7(b) illustrates an example in which PDSCH 1 transmitted to UE 1 and PDSCH 2 transmitted to UE 2 are subjected to spatial division multiplexing (SDM).

Unlike this, as illustrated in FIG. 7(c), PDSCH 1 transmitted to UE 1 and PDSCH 2 transmitted to UE 2 may be transmitted by frequency division multiplexing (FDM).

Among a scheme of servicing one area using all the antenna ports and a scheme of servicing many areas at the same time by dividing the antenna ports, a preferred scheme may be changed according to the RANK and the MCS servicing to the UE for maximizing the cell throughput.

Further, the preferred scheme is changed according to the amount of data to be transmitted to each UE.

The eNB calculates a cell throughput or scheduling metric which may be obtained when one area is serviced using all the antenna ports, and calculates the cell throughput or scheduling metric which may be obtained when two areas are serviced by dividing the antenna ports.

The eNB compares the cell throughput or the scheduling metric which may be obtained by each scheme to select the final transmission scheme.

As a result, the number of antenna ports participating in PDSCH transmission is changed by SF-by-SF.

In order for the eNB to calculate the transmission MCS of the PDSCH according to the number of antenna ports and reflect the calculated transmission MCS to a scheduling algorithm, the CSI feedback from the appropriate UE is required.

Beam Reference Signal (BRS)

Beam reference signals are transmitted on one or more antenna ports (p={0, 1, . . . , 7}).

Reference sequence n(m) is defined by Equation 2 in relation with generation of a sequence of the BRSs.

$$r_l(m) = \frac{1}{\sqrt{2}}(1 - 2 \cdot c(2m)) + j\frac{1}{\sqrt{2}}(1 - 2 \cdot c(2m+1)), \quad \text{[Equation 2]}$$
$$m = 0, 1, \ldots, 8 \cdot (N_{RB}^{max,DL} - 18) - 1$$

In Equation 2, I as 0 to 13 represents an OFDM symbol number. Further, c(i) denotes a pseudo-random sequence and a pseudo-random sequence generator may be initialized to Equation 3 at the beginning of each OFDM symbol.

$$C_{init} = 2^{10} \cdot (7 \cdot (n_s+1) + l'+1) \cdot (2 \cdot N_{ID}^{cell}+1) + 2 \cdot N_{ID}^{cell}+1 \quad \text{[Equation 3]}$$

Beam Refinement Reference Signal

Further, in relation with the beam refinement reference signal, the beam refinement reference signal is transmitted through antenna ports of up to 8 antenna ports (p=600 to 607).

In relation with the sequence generation of the beam refinement reference signal, reference signal $r_{l,n_s}(m)$ is generated as shown in Equation 4.

$$r_{l,n_s}(m) = \frac{1}{\sqrt{2}}(1 - 2c(2m)) + j\frac{1}{\sqrt{2}}(1 - 2c(2m+1)), \quad \text{[Equation 4]}$$
$$m = 0, 1, \ldots, \left\lfloor \frac{3}{8} N_{RB}^{max,DL} \right\rfloor - 1$$

In Equation 4, $n_s$ represents a slot number in a radio frame and I represents the OFDM symbol number in the slot. c(n) denotes the pseudo-random sequence and the pseudo-random sequence generator is initialized to Equation 5 at the beginning of each OFDM symbol.

$$c_{init} = 2^{10}(7(\bar{n}_s+1)+l+1)(2N_{ID}^{BRRS}+1)+2N_{ID}^{BRRS}+1$$

$$\bar{n}_s = n_s \bmod 20$$

In Equation 5, $N_{ID}^{BRRS}$ is configured in the UE through an RRC signaling.

DL Phase Noise Compensation Reference Signal

A phase noise compensation reference signal associated with xPDSCH (i.e., the PDSCH supported by the NR system) is transmitted at the antenna port(s) p=60 and/or p=61 via A signaling in A DCI format. Further, the phase noise compensation reference signal is present and/or valid only for the xPDSCH transmission associated with the antenna port, and is transmitted only in the physical resource blocks and symbols to which an sPDSCH is mapped. Further, the phase noise compensation reference signal is the same in all symbols corresponding to xPDSCH allocation.

Reference sequence r(m) is defined by Equation 6 in relation with generation of the sequence of the phase noise compensation reference signal.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 6]}$$
$$m = 0, 1, \ldots, \lfloor N_{RP}^{max,DL}/4 \rfloor - 1$$

In Equation 6, c(i) denotes the pseudo-random sequence and the pseudo-random sequence generator is initialized to Equation 7 at the beginning of each subframe.

$$c_{init} = (\lfloor n_s/2 \rfloor + 1) \cdot (2n_{ID}^{(nSCID)}+1) \cdot 2^{16} + n_{SCID} \quad \text{[Equation 7]}$$

In Equation 7, in the case of transmission of the xPDSCH, $n_{SCID}$ is given by a DCI format related with the transmission of the xPDSCH and otherwise, $n_{SCID}$ is set to 0.

Further, in the case of 3-dimension multiple-input multiple-output (3D-MIMO) or full-dimension multiple-input multiple-output (MIMO) technology, an active antenna system (AAS) having a 2-dimensional planar array structure may be used.

Figure 8:
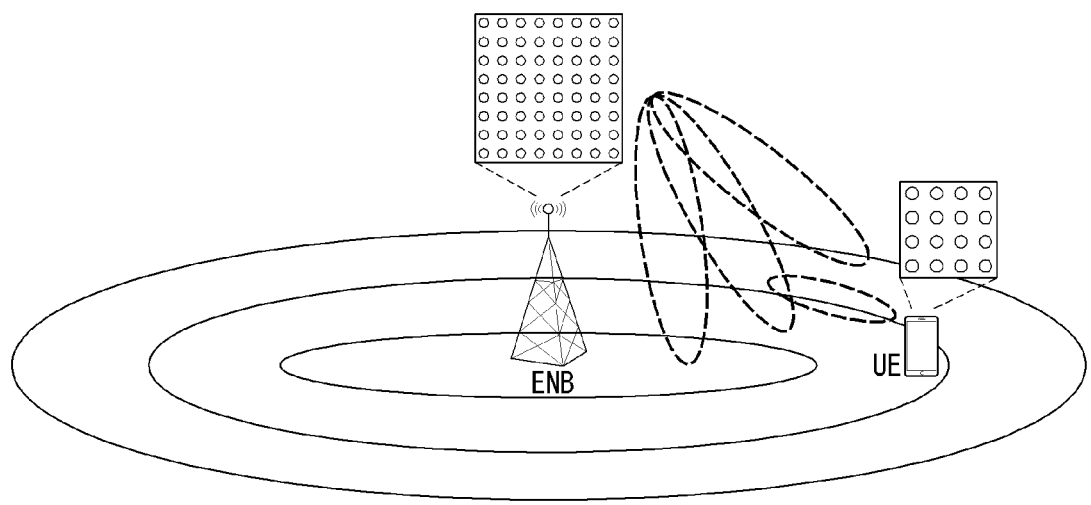
FIG. 8 illustrates an example of an MIMO system using a 2D plane array structure to which a method proposed in this specification may be applied.

FIG. 8 illustrates an example of an MIMO system using a 2D plane array structure to which a method proposed in this specification may be applied.

Through the 2D plane array structure, a large number of antenna elements may be packed within available base station type of elements and an adaptive electronic capability in a 3D space may be provided.

In relation with an MIMO design of the NR system, a CSI framework for measuring and reporting a channel state between the eNB and the UE is considered.

This specification proposes a method for reporting CSI based on a CSI framework (or CSI acquisition framework) to be described below. Specifically, this specification proposes a dynamic signaling method for CSI-RS transmission triggering (or activation/deactivation) and/or CSI reporting triggering related to a CSI reporting procedure.

In this specification, a CSI framework may be referred to as a CSI configuration and configuration information for the CSI framework may mean CSI configuration information. Further, in this specification, measurement setting may mean measurement setting, reporting setting may mean reporting setting for CSI and resource setting may mean resource setting for the CSI. In this case, the CSI configuration information may include information representing the measurement setting, information representing the reporting setting, and/or information representing the resource setting.

First, the CSI framework considered in the NR system will be described in detail.

The CSI framework may mean that a CSI related procedure is defined using CSI reporting setting, resource setting, CSI measurement setting, and CSI measurement setting unlike a legacy LTE system in which the CSI related procedure is defined only in the form of a CSI process. Accordingly, in the NR system, the CSI related procedures may be performed in a more flexible scheme according to a channel and/or resource situation.

That is, a configuration for the CSI related procedure in the NR system may be defined by combining the CSI reporting setting, the resource setting, and the CSI measurement setting.

For example, the UE may be configured to acquire the CSI by N≥1 CSI reporting settings, M≥1 resource settings, and one CSI measurement setting. Here, the CSI measurement setting may mean setting information for a link between N CSI reporting settings and M resource settings. Further, here, the resource settings include reference signal (RS) settings and/or Interference Measurement settings (IM settings).

Figure 9:
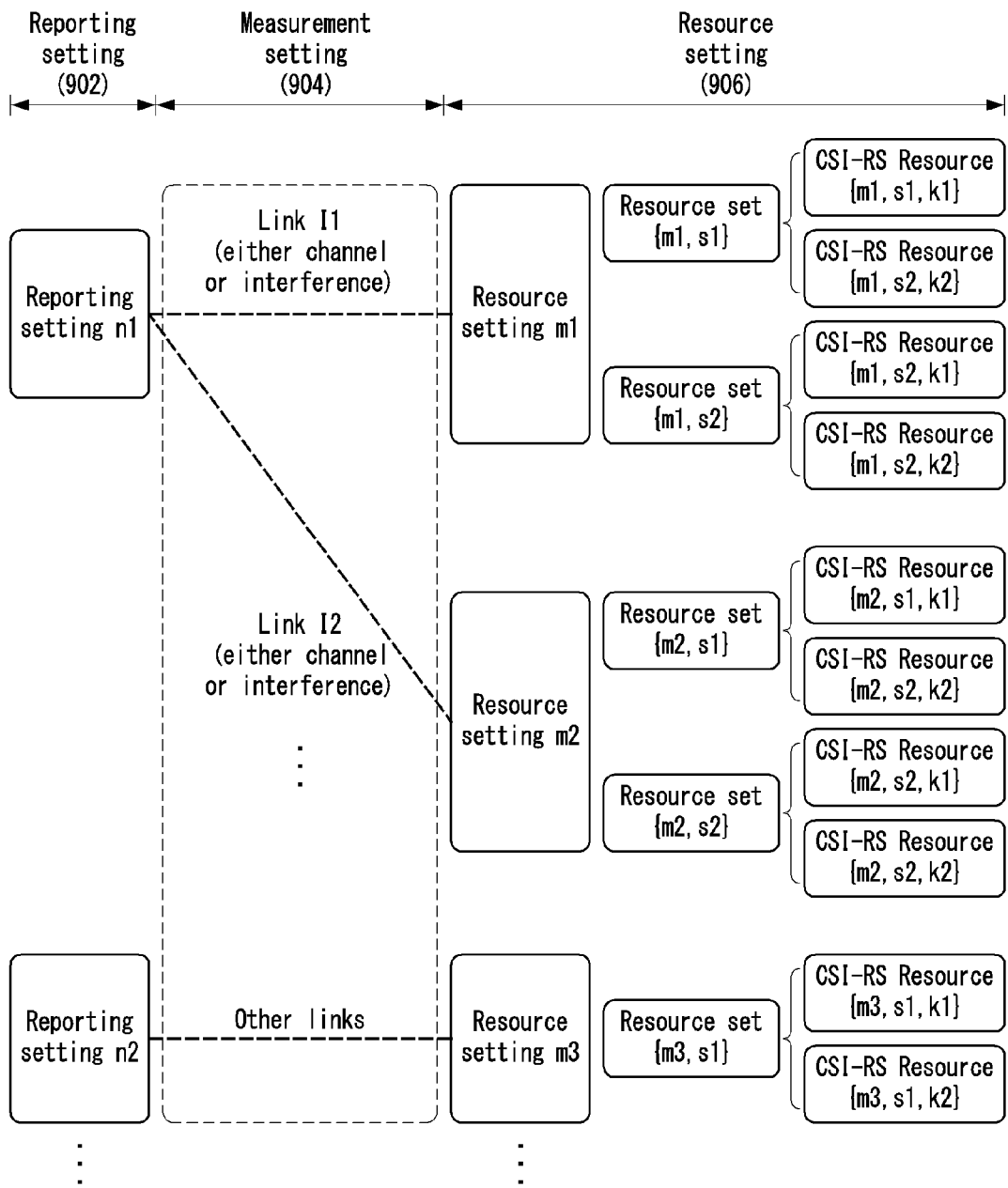
FIG. 9 illustrates an example of a CSI framework considered in an NR system to which a method proposed in this specification may be applied.

FIG. 9 illustrates an example of a CSI framework considered in an NR system to which a method proposed in this specification may be applied.

Referring to FIG. 9 may be configured by reporting setting 902, measurement setting 904, and resource setting 906. Here, the reporting setting may mean the CSI reporting setting, the measurement setting may mean the CSI measurement setting, and the resource setting may mean the CSI-RS resource setting.

As illustrated in FIG. 9, the reporting setting 902 may be constituted by N (N≥1) report settings (e.g., Reporting setting n1, Reporting setting n2, etc.).

Further, the resource setting 906 may be constituted by M (M≥1) resource settings (e.g., Resource setting m1, Resource setting m2, Resource setting m3, etc.). Here, each resource setting may include S (S≥1) resource sets and each resource set may include K (K≥1) CSI-RSs.

Further, the measurement setting 904 may mean setting information indicating the link between the reporting setting and the resource setting and a measurement type configured for the corresponding link. In this case, each measurement setting may include L (L≥1) links. For example, the measurement setting may include setting information for a link (Link l1) between Reporting setting n1 and Resource setting m1, setting information for a link (Link l2) between Reporting setting n1 and Resource setting m2, and the like.

In this case, each of Link l1 and Link l2 may be configured as any one of a channel measurement link or an interference measurement link. Moreover, Link l1 and/or Link l2 may be configured for rate matching or other purposes.

In this case, one or more CSI reporting settings within one CSI measurement setting may be selected dynamically via Layer 1 (L2) signaling or L2 (Layer 2) signaling. Further, one or more CSI-RS resource sets selected from at least one resource setting and one or more CSI-RS resources selected from at least one CSI-RS resource set are also dynamically selected via the L1 or L2 signaling.

Hereinafter, the CSI reporting setting, the resource setting (i.e., CSI-RS resource setting), and the CSI measurement setting constituting the CSI framework considered in the NR system will be described.

CSI Reporting Setting

First, the CSI reporting setting may mean information for setting a type of CSI reporting which the UE is to perform with respect to the eNB, information included in the CSI reporting, and the like.

For example, the CSI reporting setting may include a time-domain behavior type of a time domain, frequency granularity, CSI parameters (e.g., Precoding Matrix Indicator (PMI), Rank Indicator (RI), and Channel Quality Indicator (CQI)) to be reported, a CSI type (e.g., CSI Type 1 or 2, CSI with high complexity, or CIS with low complexity), a codebook configuration including codebook subset restriction, a measurement restriction configuration, and the like.

In this specification, the operation type of the time domain may mean an aperiodic operation, a periodic operation, or a semi-persistent operation.

In this case, a setting parameter(s) for the CSI reporting setting may be configured (or indicated) through higher layer signaling (e.g., RRC signaling).

Resource Setting

Next, the resource setting may mean information for setting resource to be used for CSI measurement and reporting. For example, the resource setting may include an operation pattern of the time domain, a type (e.g., Non-Zero Power CSI-RS (NZP CSI-RS), Zero Power CSI-RS (ZP CSI-RS), DMRS, etc.) of the RS, a resource set constituted by K resources, and the like.

As mentioned above, each resource setting may include one or more resource sets and each resource set may include one or more resources (e.g., CSI-RS resources). Further, the resource setting may include a setting for a signal for channel measurement and/or interference measurement.

As an example, each resource setting may include setting information for S resource sets (e.g., CSI-RS resource sets) and may also include setting information for K resources for each resource set. In this case, each resource set may correspond to sets differently selected from a pool of all CSI-RS resources configured for the UE. Further, the setting information for each resource may include information to a resource element, the number of ports, the operation type of the time domain, and the like.

Alternatively, as another example, each resource setting may include setting information for S CSI-RS resources and/or K CSI-RS resources of ports of a number equal to or smaller than each CSI-RS resource.

In this case, a CSI-RS RE mapping pattern of an N-port CSI-RS resource may be constituted by one or more CIS-RS mapping patterns of CSI-RS resources of the same or smaller number. Here, the CSI-RS RS mapping pattern may be defined in the slot and spanned to multiple configurable consecutive/inconsecutive OFDM symbols.

In this case, a setting parameter(s) for the resource setting may be configured through higher layer signaling (e.g., RRC signaling).

CSI Measurement Setting

Next, the CSI measurement setting may mean setting information indicating which measurement the UE is to perform with respect to a specific CSI reporting setting and a specific resource setting mapped thereto for the CSI reporting. That is, the CSI measurement setting may include information on the link between the CSI reporting setting and the resource setting and may include information indicating a measurement type for each link. Further, the measurement type may mean channel measurement, interference measurement, rate matching, etc.

As an example, the CSI measurement setting may include information indicating the CSI reporting setting, information indicating the resource setting, and a setting for a reference transmission scheme in the case of the CQI. In this regard, the UE may support L≥1 CSI measurement settings and an L value may be set according to a capability of the corresponding UE.

In this case, one CSI reporting setting may be connected to one or more resource settings and multiple CSI reporting settings may be connected to the same resource setting.

In this case, a setting parameter(s) for the CSI measurement setting may be configured through higher layer signaling (e.g., RRC signaling).

Further, in relation with the CSI reporting setting, the resource setting, and the CSI measurement setting, agreements depending on the operation type of the time domain are as follows.

First, in the case of the periodic CSI-RS (i.e., a case where transmission of the CSI-RS is periodically performed), semi-persistent CSI reporting may be activated/deactivated by MAC CE and/or downlink control information (DCI). Unlike this, the aperiodic CSI reporting may be triggered by the DCI, however, in this case, additional signaling configured to the MAC CE may be required.

Next, in the case of the semi-persistent CSI-RS (i.e., a case where transmission of the CSI-RS is semi-persistently performed), periodic CSI reporting is not supported. On the contrary, semi-persistent CSI reporting may be activated/deactivated by the MAC-CE and/or DCI and the semi-persistent CSI-RS may be activated/deactivated by the MAC-CE and/or DCI. Further, in this case, the aperiodic CSI reporting may be triggered by the DCI and the semi-persistent CS-RS may be activated/deactivated by the MAC-CE and/or DCI.

Last, in the case of the aperiodic CSI-RS (i.e., a case where transmission of the CSI-RS is aperiodically performed), the periodic (and semi-persistent) CSI reporting is not supported. On the contrary, the aperiodic CSI reporting may be triggered by the DCI and the aperiodic CS-RS may be triggered by the DC and/or MAC-CE.

It is to be understood that the embodiments described in this specification are just distinguished for easy description and some configurations or features of certain embodiments may be included in other embodiments or may be replaced with corresponding configurations or features of other embodiments. For example, hereinafter, schemes to be described in first to third embodiments may be applied to a scheme to be described in a fourth embodiment and vice versa.

Hereinafter, setting methods which may be considered with respect to the resource setting (i.e., CSI-RS resource setting), CSI measurement setting, and CSI reporting setting will be described.

First Embodiment—Setting Method Considerable for Resource Setting

First, in relation with the above-described resource setting, the CSI-RS resource setting may include two types of RS types such as NZP CSI-RS and ZP CSI-RS (for reference, the CSI-RS mentioned in this specification may be applied to both the NZP CSI-RS and the ZP CSI-RS).

Both the NZP CSI-RS resource and the ZP CSI-RS resource may be set within the corresponding resource settings because the use of a specific resource is indicated within each of the CSI measurement settings. Here, the ZP CSI-RS may be used for interference estimation (i.e., interference measurement) or rate matching for data channels (e.g., NR-PDSCH). In addition, the NZP CSI-RS may be applied not only for channel estimation (i.e., channel measurement) but also for interference estimation.

Further, the NZP CSI-RS included in the resource setting may be applied to both CSI acquisition and beam management.

Specifically, the CSI-RS resources for beam management may also be included in a resource setting for a unified operation for analog beam selection and digital beam selection. One of the main functions of CSI acquisition is beam selection through UE feedback information such as PMI and CSI-TE Resource Indication (CRI). The purpose of DL beam management may also be to select the beam(s) and the TRP transmission beam may be selected via the UE feedback information. Only the additional function of DL beam management is to select a UE reception beam, but the UE reception beam selection may be supported simply by transmitting a plurality of repeated transmit beams via CSI-RS symbols or sub-symbols. As a result, the above-described CSI framework may also be used for the purpose of beam management.

For such a resource setting, three time-domain operation types may be supported, such as aperiodic CSI-RS, semi-persistent CSI-RS, and periodic CSI-RS. In this case, the three types of time-domain operation types described above may be commonly applied to both the NZP CSI-RS and the ZP CSI-RS. In this regard, an aperiodic Interference Measurement Resource (IMR) and a semi-persistent IMR may provide high interference estimation accuracy and high flexibility for a system design, considering a dynamic TDD operation and forward compatibility of the NR system.

Further, the resource setting may include a CSI-RS timing offset (hereinafter, referred to as 'X'). Here, X may mean a time gap between a triggering/activation/deactivation timing and an actual CSI-RS transmission timing of the CSI-RS. Here, a CSI-RS timing offset may be expressed in the form of the number of slots (i.e., slot unit) or the number of symbols (i.e., symbol unit). As an example, when aperiodic CSI-RS triggering is performed by the DCI, X may be set to '0'.

In relation with the aforementioned X, in various embodiments of the present invention, when X is set by the network (i.e., eNB), candidate values of X may be indicated by a higher layer message (e.g., RRC message) and included in the resource setting on the CIS framework. Here, a case where X is supported to be set is assumed. That is, X may be set to a specific value (e.g., 0), but set to values (e.g., 0, 1, 2) which may be used differently according to a situation.

For example, the UE may be indicated '1' as the X value for beam management from the eNB. As a result, when the transmission of the CSI-RS is triggered at a specific timing, the corresponding UE may recognize that the CSI-RS is transmitted after a time gap corresponding to '1' based on the specific timing.

Further, in this case, the X value to be applied for channel or interference measurement may be indicated through a relatively dynamic signaling means such as MAC-CE or DCI. Here, the corresponding indication may be included in the MAC-CE and/or DCI for the CSI-RS triggering and together transferred.

Alternatively, for the CSI-RS triggering, a hierarchical signaling structure may be applied, in which a candidate resource is selected through the MAC-CE in the resource setting configured by the RRC signaling and then, a final resource is selected by the DCI. In this case, the X value may be included in any one of the MAC-CE or the DCI. Alternatively, a candidate group may be selected through the MAC-CE and then, a final X value may be set (or indicated) through the DCI.

Second Embodiment—Setting Method Considerable for CSI Measurement Setting

Next, in relation with the above-described CSI measurement setting, in the NR system, a flexible measurement setting may be allowed, which supports a predetermined combination of the aperiodic/semi-persistent/periodic resource setting for channel measurement and the aperiodic/semi-persistent/periodic resource setting for interference.

In particular, the semi-persistent or periodic interference measurement resources (e.g., ZP CSI-RS and NZP CSI-RS) need to be considered in order to avoid or minimize L1/L2 control signaling when considering semi-persistent CSI reporting or periodic CSI reporting. Further, the aperiodic CSI-RS setting may be associated with semi-persistent or periodic interference measurement resources for the aperiodic CSI reporting. Conversely, the semi-persistent or periodic CSI-RS may be associated with the aperiodic interference measurement resources for the aperiodic CSI reporting.

In conclusion, the measurement setting needs to support a flexible mapping scheme among the aperiodic/semi-persistent/persistent CSI reporting, the aperiodic/semi-persistent/persistent resource setting (e.g., NZP CSI-RS) for the channel measurement, and the aperiodic/semi-persistent/persistent resource settings (e.g., NZP CSI-RS and NZP CSI-RS) for the interference measurement.

Third Embodiment—Setting Method Considerable for CSI Reporting Setting

Next, in relation with the above-described CSI reporting setting, the NR system may support the aperiodic CSI reporting, the semi-persistent CSI reporting, and the periodic CSI reporting.

In this case, appropriate CSI reporting contents need to be defined according to the above-described CSI measurement setting configuration.

First, if the CSI-RS resource(s) for CSI acquisition is indicated in a specific measurement setting, the corresponding CSI reporting contents may be existing CSI reporting types supported in the LTE system (in particular, eFD-MIMO WI).

Unlike this, if the CSI-RS resource(s) for the beam management are indicated in a specific measurement setting, the corresponding CSI report contents may be determined based on required reporting contents in order to support DL beam management. Since respective CSI-RS ports in the CSI resource may correspond to different analog beams, the corresponding CSI reporting contents may be information (e.g., {CRI, port index}) configured by a pair for reporting appropriate beam direction information. In addition to beam related information, a beam gain related metric such as RSRP needs to be reported together.

Further, the CSI reporting setting may include a CSI-RS reporting offset (hereinafter, referred to as 'Y'). Here, Y may mean the time interval between the triggering/activation/deactivation timing for the CSI reporting and the actual CSI reporting timing. Here, Y may be expressed in the form of the number of slots (i.e., slot unit) or the number of symbols (i.e., symbol unit). In this case, the Y value may be previously fixed on the system or configured (or indicated) by the network. A candidate value for the Y value may be determined by considering a CSI computation time and the candidate value may be configured according to the number of CSI measurement/resource/reporting settings, a CSI feedback type, the number of ports, a UE capability, and the like.

Fourth Embodiment—CSI Framework Based Dynamic Signaling Procedure

Hereinafter, a dynamic signaling method (i.e., dynamic signaling related to CSI reporting and CSI-RS transmission) related to the CSI framework will be described in detail.

In this regard, it is agreed that the aperiodic CSI reporting is triggered by the DCI. On the contrary, signaling operations for the aperiodic CSI-RS triggering, semi-persistent CSI-RS activation/deactivation, and semi-persistent CSI reporting activation/deactivation are still discussed. Here, the CSI-RS triggering/activation/deactivation may mean triggering/activation/deactivation for the CSI-RS transmission.

In this case, when the aperiodic CSI-RS triggering is performed by the MAC-CE, overhead due to excessive control signaling may be increased in terms of the RS. Further, due to the delay of the control signaling, a flexible usage of the aperiodic CSI-RS may be limited. Accordingly, the aperiodic CSI-RS may be preferably triggered by the DCI.

Further, the semi-persistent CSI-RS and CSI reporting may be preferably activated and/or deactivated through the MAC-CE. The reason is that according to semi-persistent characteristics, when detection of the DCI is unsuccessful, a large influence may be received. For example, when a deactivation signal is missing, channel estimation may not be accurately performed and when an activation signal is missing, data demodulation performance may be degraded due to incorrect rate matching.

In other words, the aperiodic CSI-RS may be triggered by the DCI and the semi-persistent CSI-RS and CSI reporting may be preferably activated or deactivated by the MAC-CE.

Referring to the aforementioned contents, L1/L2 signaling (e.g., signaling through DCI/MAC-CE) may be used for aperiodic or semi-persistent CSI reporting and for transmission of the aperiodic or semi-persistent CSI-RS.

In this case, in the case of CSI reporting triggering/activation/deactivation, one CSI reporting setting needs to be dynamically indicated in the CSI measurement setting. Alternatively, multiple CSI reporting settings may be dynamically indicated for a purpose of a coordinated multipoint operation (CoMP operation). That is, selection of one or more CSI reporting settings in specific CSI measurement setting may be supported by the L1 or L2 signaling.

Further, in the case of the CSI-RS triggering/activation/deactivation, one CSI-RS resource selected in one or more resource settings (i.e., at least one resource setting) needs to be dynamically indicated. Alternatively, similarly to the case of the CSI reporting, multiple CSI-RS resources may be dynamically indicated by considering the CoMP operation. That is, selection of one or more CSI-RS resources in at least one resource setting may be supported by the L1 or L2 signaling.

Further, when the aperiodic CSI-RS and the aperiodic CSI reporting are jointly triggered, joint selection for the CSI reporting setting(s) and CSI-RS resource(s) may be performed. Here, the joint selection for the CSI reporting setting(s) and CSI-RS resource(s) may mean simultaneous selection (or indication and setting) of the CSI reporting setting(s) and CSI-RS resource(s). Such a scheme may be similarly applied even to the semi-persistent CSI-RS and semi-persistent CSI reporting.

Further, information on an RE pattern (i.e., RE mapping pattern) or resource aggregation of the CSI-RS may be transferred only through higher layer signaling (e.g., RRC signaling).

In relation with the dynamic signaling methods, in particular, in this specification, a method for triggering transmission of the CSI-RS and CSI reporting for CSI measurement and reporting by the UE will be described.

As mentioned above, the triggering, activation, or deactivation of the CSI-RS or triggering, activation, or deactivation of the CSI reporting may be performed through the L1 or L2 signaling. In this case, in particular, when the triggering for the CSI-RS and the triggering for the CSI reporting are simultaneously performed, one or more CSI-RS resources may be selected in at least one resource setting simultaneously when one or more CSI reporting settings may be selected (or indicated) in the CSI measurement setting.

In this case, a method for indicating the aforementioned selection may be preferable through the DCI which the eNB transmits to the UE.

For reference, in the case of the legacy LTE system, a joint triggering scheme is used for the transmission of the CSI-RS and the CSI reporting. In other words, the transmission of the CSI-RS and the CSI reporting are not independently triggered. In this case, since the triggering for the transmission of the CSI-RS and the triggering for the CSI reporting are particularly indicated through a mapping relationship, flexibility between the triggerings may be degraded.

Contrary to this, in the case of the NR system, by considering that the CSI framework constituted by the measurement setting, the resource setting, and the reporting setting is used instead of a CSI process used in the legacy LTE system, the flexibility for the triggering for the transmission of the CSI-RS and the CSI reporting may be required. Accordingly, a method for performing the triggering for the transmission of the CSI-RS and the triggering for the CSI reporting independently needs to be considered.

In this regard, in particular, this specification proposes methods for independently indicating (or performing) the triggering (e.g., first triggering) for the transmission of the CSI-RS and the triggering (e.g., second triggering) for the CSI reporting through the DCI.

Figure 10:
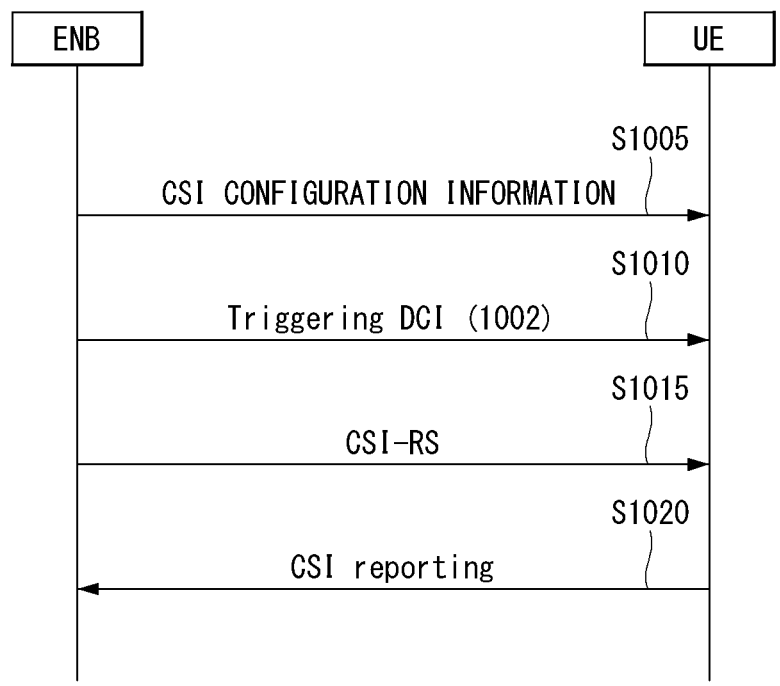
FIG. 10 illustrates overall procedures for CSI measurement and reporting to which a method proposed in this specification may be applied.

FIG. 10 illustrates overall procedures for CSI measurement and reporting to which a method proposed in this specification may be applied. FIG. 10 is just for convenience of the description and does not limit the scope of the present invention.

Referring to FIG. 10, it is assumed that the triggering for the transmission of the CSI-RS and the triggering for the CSI reporting are simultaneously performed.

In step S1005, the UE may receive CSI configuration information from the eNB. Here, the CSI configuration information may mean information (i.e., information on CSI measurement setting, CSI reporting setting, and resource setting) on the above-described CSI framework. At this time, the corresponding UE may receive the CSI configuration information through higher layer signaling.

In step S1010, the UE may be instructed via a triggering DCI 1002 to trigger the transmission of the CSI-RS and trigger the CSI reporting from the eNB. At this time, the UE may be instructed to simultaneously transmit the CSI-RS and report the CSI through the triggering DCI 1002. Detailed contents of the triggering DCI 1002 will be described below with reference to FIG. 11.

In step S1015, the UE may receive one or more triggered CSI-RSs from the eNB.

Thereafter, in step S1020, the UE may perform CSI reporting on the estimated (or measured) result using the received CSI-RSs.

FIG. 11 illustrates examples of a triggering DCI structure to which a method proposed in this specification may be applied. FIG. 11 is just for convenience of the description and does not limit the scope of the present invention.

Referring to FIG. 11, the triggering DCI 1002 in FIG. 10 for the triggering for the transmission of the CSI-RS and the triggering for the CSI reporting may be constituted by three structures. Three structures include a) a structure configured as each field in a specific DCI (i.e., the same DCI), b) a structure configured as flag information and a common field in the specific DCI, and c) a structure configured as a separate DCI.

(Method 1: Method Using Structure Configured as Each Field in Specific DCI)

First, a method for configuring each of a field for CSI-RS triggering information (i.e., CSI-RS Trig Info) and a field for CSI reporting triggering information (i.e., CSI reporting Trig Info) in the DCI will be described.

Referring to structure a) of FIG. 11, the triggering for the transmission of the CSI-RS and the triggering for the CSI reporting may be performed, respectively in the specific DCI (i.e., the same DCI or one DCI). For example, the CSI-RS triggering information may include a CSI-RS resource index for transmitting the CSI-RS and the CSI reporting triggering information may include a CSI reporting setting index.

In this case, each field may be constituted by a separate field and may be constituted by sub-fields in one triggering field.

In this case, the UE may be instructed to perform the CSI-RS triggering and the CSI reporting triggering by decoding only one DCI. That is, as the field is differently configured even by using one DCI, it is advantages in that two triggerings may be distinguished.

(Method 2: Method Using Structure Configured as Flag Information and Common Field in Specific DCI)

Next, a method for configuring the flag information for distinguishing the CSI-RS triggering and the CSI reporting triggering and the common field for indicating the triggering information in the DCI will be described.

Referring to structure b) of FIG. 11, flag information (e.g., 1 bit information) for distinguishing two triggerings may exist in the specific and a field for indicating the CSI-RS triggering information (CSI-RS Trig Info) or the CSI reporting triggering information (CSI reporting Trig Info) may exist in the specific DCI (i.e., the same DCI or one DCI).

For example, when the flag information indicates the triggering for the CSI-RS, the CSI-RS resource index may be indicated in the common field. On the contrary, when the flag information indicates the triggering for the CSI reporting, a CSI reporting setting index may be indicated in the common field.

Alternatively, the flag information may further indicate whether to simultaneously trigger the CSI-RS and the CSI reporting. In other words, the flag information may indicate whether to jointly trigger the triggering for the CSI-RS and the triggering for the CSI reporting. At this time, a bit for indicating whether the joint triggering is performed may be additionally set in the flag information. In this case, the CSI-RS triggering information and the CSI reporting triggering information may be together indicated in the common field. For example, indication information in the common field may include information in which the CSI-RS resource index and the CSI reporting setting index are jointly encoded.

The corresponding method has an advantage in that the amount of triggering information included in the specific DCI may be reduced through the flag information.

(Method 3: Method Using Structure Configured as Separate DCI)

Next, a method for separately configuring the DCI for the CSI-RS triggering and the DCI for the CSI reporting triggering will be described. In other words, the corresponding method is a method for separately designing the DCI including the CSI-RS triggering field and the DCI including the CSI reporting triggering field. That is, the CSI-RS triggering information (CSI-RS Trig Info) and the CSI reporting triggering information (CSI reporting Trig Info) may be configured to be included in different DCIs. For example, a DCI format and/or PDCCH resource may be configured differently for the CSI-RS triggering and the CSI report triggering.

As an example, the CSI-RS triggering field may be included in a DL DCI providing DL scheduling information and the CSI reporting triggering field may be included in a UL DCI providing UL scheduling information. In this case, the type of the DCI may be configured to be reversed for each triggering field, of course.

At this time, the UE may recognize that two DC's may be together indicated in the same slot (or the same symbol(s)) and perform an operation for detecting (or monitoring) both two DCIs.

In this case, as the DCI format for each triggering is differently designed, a probability that the UE will misinterpret specific triggering as another triggering may be reduced.

In addition, when dynamically selecting (or indicating) one or more CSI reporting settings within a specific CSI measurement setting for triggering or activation of the CSI reporting, there may be multiple resource settings preconnected (i.e., pre-linked) with the corresponding reporting setting (e.g., pre-configured through RRC signaling).

In this case, in various embodiments of the present invention, a method for transferring an indicator for turning on/off a specific link(s) for more efficient (and/or dynamic) CSI measurement and reporting may be considered.

For example, it may be assumed that for one reporting setting, a first resource setting configured as an NZP CSI-RS resource and a second resource setting configured as an NZP CSI-RS resource are concatenated through two channel links and a third resource setting configured as a ZP CSI-RS resource is concatenated through one interference link. In this case, when the aperiodic CSI reporting is triggered while all of three links are connected, the UE may perform the CSI measurement and reporting by assuming that all of the two NZP CSI-RS resources operate as the serving cell (i.e., by assuming CoMP joint transmission).

In this case, when the method for turning on/off a specific link is applied, as an example, a link corresponding to any one of the first resource setting and the second resource setting may be dynamically turned off. In this case, the UE may perform the CSI measurement and reporting by assuming only one eNB (i.e., only one NZP CSI-RS resource) as the serving cell. As another example, when the link corresponding to the third resource setting (i.e., ZP CSI-RS resource) is turned off through the indicator, the UE may perform the CSI measurement and reporting by assuming that there is no interference.

The corresponding method has an advantage in that the link setting in the measurement setting may be flexibly changed through the indicator. Therefore, the interference measurement or channel measurement based on a specific resource may be flexibly adjusted and an operation of retransmitting (or re-receiving) the measurement setting may be reduced in order to change the link setting. As an example, an unnecessary operation of configuring a separate measurement setting may not be required in order to change on/off for a specific link. That is, more adaptive channel measurement or interference measurement may be performed using the link setting change via the indicator.

Further, in various embodiments of the present invention, a method for transferring an indicator for swapping the use of a specific link(s) together for more efficient (and/or dynamic) CSI measurement and reporting may be considered. Here, the operation of swapping the use of the specific link may refer to changing the use of the link from the channel measurement to the interference measurement, changing the use of the link to rate matching, or vice versa. That is, the operation of swapping the use of the specific link may refer to an operation of changing the use of the link to any one of the channel measurement, the interference measurement, or the rate matching.

For example, it may be assumed that for one reporting setting, a first resource setting configured as an NZP CSI-RS resource and a second resource setting configured as an NZP CSI-RS resource are concatenated through two channel links and a third resource setting configured as a ZP CSI-RS resource is concatenated through one interference link. In this case, the link corresponding to the first resource setting (i.e., NZP CSI-RS resource) may be changed to a link for the interference measurement through the indicator. This is possible because the NZP CSI-RS resource may be used for the channel measurement and the interference measurement.

The corresponding method has an advantage in that the link setting in the measurement setting may be flexibly changed through the indicator like the method described above. Therefore, the interference measurement or channel measurement based on a specific resource may be flexibly adjusted and an unnecessary operation of separately retransmitting (or re-receiving) the measurement setting may be reduced in order to change the link setting.

In this case, the indicator (i.e., link o/off indicator and/or swapping indicator) used in the aforementioned methods may be transferred through the L1 or L2 signaling (i.e., DCI or MAC-CE). Further, the indicator may be transferred together with the information (e.g., the triggering DCI 1002 of FIG. 10) indicating the CSI reporting triggering or activation.

Alternatively, for the CSI-RS reporting triggering, a hierarchical signaling structure may be applied, in which candidate resource settings are selected through the MAC-CE in the multiple resource setting configured by the RRC signaling and then, a final resource setting is selected by the DCI. In this case, the indicator may be included in any one of the MAC-CE or the DCI. Alternatively, multiple link on/off (or link swapping) candidate groups may be selected through the MAC-CE and then, final link on/off (or link swapping) may be indicated through the DCI.

Further, in various embodiments of the present invention described above, a specific resource (i.e., resource setting) in the CSI measurement setting may be set (or indicated) for the purpose of the rate matching during demodulation of a data channel (e.g., NR-PDSCH). In other words, when it is determined that the interference given (or received) by the corresponding CSI-RS resource is large, such as the ZP CSI-RS of the legacy LTE system, the eNB may configure (or indicate) the corresponding resource for the purpose of nulling. Therefore, the degree of interference which may occur in the channel measurement or interference measurement of the UE receiving the corresponding indication may be efficiently controlled.

Figure 12:
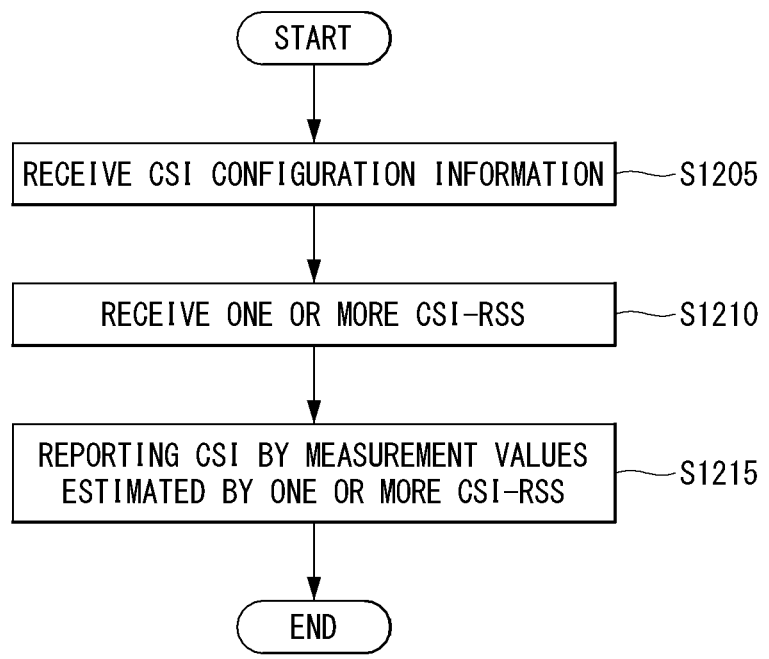
FIG. 12 illustrates an operation flowchart of a user equipment which measures and reports CSI in a wireless communication system to which a method proposed in this specification may be applied.

FIG. 12 illustrates an operation flowchart of a user equipment which measures and reports CSI in a wireless communication system to which a method proposed in this specification may be applied. FIG. 12 is just for convenience of the description and does not limit the scope of the present invention.

Referring to FIG. 12, the operation of the UE of FIG. 12 may be materialization of the operation of the UE described in FIG. 10.

In step S1205, the UE receives CSI configuration information related to a CSI reporting procedure. Here, the CSI configuration information includes the CSI measurement setting information, the CSI reporting setting information, and the resource setting (i.e., CSI-RS resource setting) information.

Thereafter, in step S1210, the UE receives one or more CSI-RSs based on the resource setting information. In this case, the UE may receive a triggering indication for the CSI-RS transmission before receiving one or more CSI-RSs and this may be indicated together with the CSI reporting triggering. In this case, receiving the CSI-RS based on the resource setting information may mean receiving the CSI-RS through the CSI-RS resources indicated by the triggering based on the resource setting information received in step S1205.

Thereafter, in step S1215, the CSI is reported, which is determined by measurement values estimated by the one or more CSI-RSs based on the CSI measurement setting information and the CSI reporting setting information.

In this case, first triggering for transmission of the one or more CSI-RSs and second triggering for reporting of the CSI may indicated through downlink control information (DCI).

In this case, the first triggering and the second triggering are indicated for the UE simultaneously, that is, in the same slot.

Further, the first triggering and the second triggering may be indicated through a specific DCI (i.e. one DCI). The specific DCI may include a first field for the first triggering and a second field for the second triggering. For example, as illustrated in FIG. 11(*a*), the fields for the first triggering and the second triggering, respectively may be configured in the same DCI. In this case, the first field may indicate indexes for one or more CSI-RS resources related to the first triggering and the second field may indicate indexes for one or more CSI reporting settings related to the second triggering.

Further, the first triggering and the second triggering may be indicated through the specific DCI and the specific DCI may include flag information indicating the first triggering or the second triggering and a common field. For example, as illustrated in FIG. 11(*b*), the specific DCI may include flag information for distinguishing the first triggering and the second triggering and a common field for indicating triggering related information. In this case, as described above, the flag information may further indicate whether joint triggering between the first triggering and the second triggering is performed. In this case, the information on each triggering may be together indicated through the common field.

Further, the first field for the first triggering may be included in a first DCI and the second field for the second triggering may be included in a second DCI. In other words, as illustrated in FIG. 11(3), different DCIs may be configured for the CSI-RS triggering and the CSI reporting triggering.

Further, together with the second triggering, the link on/off indicator or link swapping indicator (or swapping information) may be transferred.

Further, the one or more CSI-RSs may be configured to be aperiodically transmitted (i.e., aperiodic CSI resource setting) and the CSI may be configured to be aperiodically reported (i.e., aperiodic CSI reporting setting).

Overview of Devices to which Present Invention is Applicable

Figure 13:
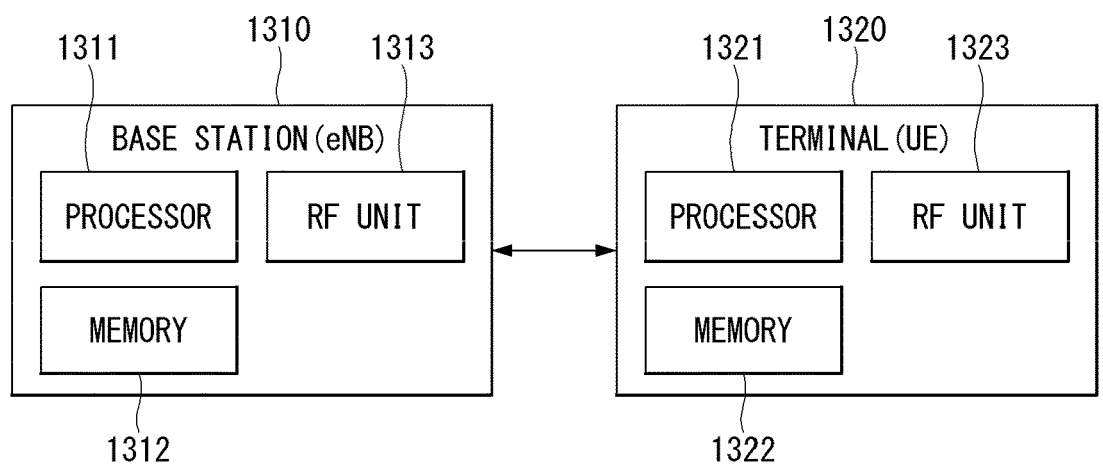
FIG. 13 illustrates a block diagram of a wireless communication device according to an embodiment of the present invention.

FIG. 13 illustrates a block diagram of a wireless communication device according to an embodiment of the present invention.

Referring to FIG. 13, a wireless communication system includes a base station (or network) 1310 and a UE 1320.

The base station 1310 includes a processor 1311, a memory 1312, and a communication module 1313.

The processor 1311 implements a function, a process, and/or a method which are proposed in FIGS. 1 to 12 above. Layers of a wired/wireless interface protocol may be implemented by the processor 1311. The memory 1312 is connected with the processor 1311 to store various pieces of information for driving the processor 1311. The communication module 1313 is connected with the processor 1311 to transmit and/or receive a wired/wireless signal.

The communication module 1313 may include a radio frequency (RF) unit for transmitting/receiving a radio signal.

The UE 1320 includes a processor 1321, a memory 1322, and a communication module (or RF unit) 1323. The processor 1321 implements a function, a process, and/or a method which are proposed in FIGS. 1 to 12 above. The layers of the wireless interface protocol may be implemented by the processor 1321. The memory 1322 is connected with the processor 1321 to store various pieces of information for driving the processor 1321. The communication module 1323 is connected with the processor 1321 to transmit and/or receive the wireless signal.

The memories 1312 and 1322 may be positioned inside or outside the processors 1313 and 1321 and connected with the processors 1313 and 1321 by various well-known means.

Further, the base station 1310 and/or the UE 1320 may have a single antenna or multiple antennas.

Figure 14:
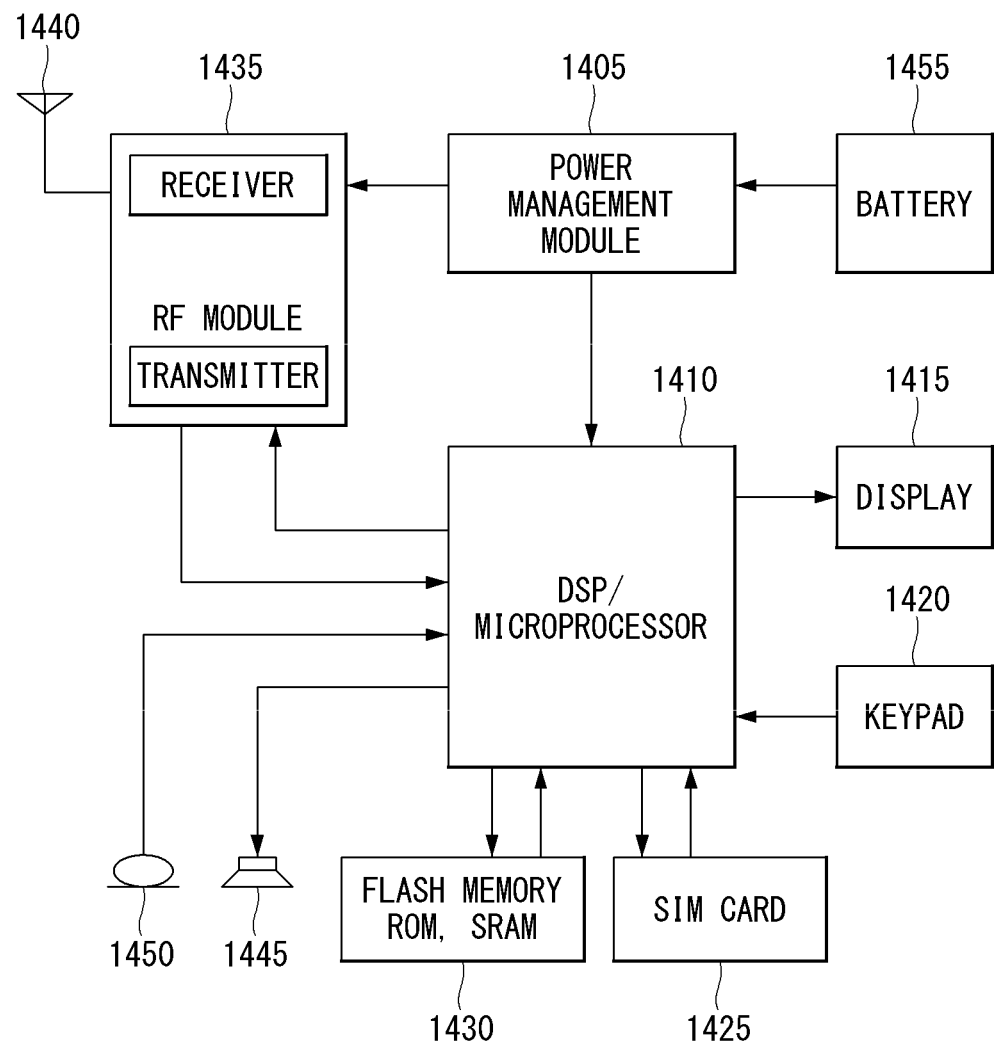
FIG. 14 illustrates a block diagram of a communication device according to an embodiment of the present invention.

FIG. 14 illustrates a block diagram of a communication device according to an embodiment of the present invention.

In particular, FIG. 14 is a diagram more specifically illustrating the UE of FIG. 13 above.

Referring to FIG. 14, the UE may be configured to include a processor (or a digital signal processor (DSP) 1410, an RF module (or RF unit) 1435, a power management module 1405, an antenna 1440, a battery 1455, a display 1415, a keypad 1420, a memory 1430, a subscriber identification module (SIM) card 1425 (this component is optional), a speaker 1445, and a microphone 1450. The UE may also include a single antenna or multiple antennas.

The processor 1410 implements a function, a process, and/or a method which are proposed in FIGS. 1 to 12 above. Layers of a wireless interface protocol may be implemented by the processor 1410.

The memory 1430 is connected with the processor 1410 to store information related to an operation of the processor 1410. The memory 1430 may be positioned inside or outside the processor 1410 and connected with the processor 1410 by various well-known means.

A user inputs command information such as a telephone number or the like by, for example, pressing (or touching) a button on the keypad 1420 or by voice activation using the microphone 1450. The processor 1410 receives such command information and processes to perform appropriate functions including dialing a telephone number. Operational data may be extracted from the SIM card 1425 or the memory 1430. In addition, the processor 1410 may display command information or drive information on the display 1415 for the user to recognize and for convenience.

The RF module 1435 is connected with the processor 1410 to transmit and/or receive an RF signal. The processor 1410 transfers the command information to the RF module 1435 to initiate communication, for example, to transmit wireless signals constituting voice communication data. The RF module 1435 is constituted by a receiver and a transmitter for receiving and transmitting the wireless signals. The antenna 1440 functions to transmit and receive the wireless signals. Upon receiving the wireless signals, the RF module 1435 may transfer the signal for processing by the processor 1410 and convert the signal to a baseband. The processed signal may be converted into to audible or readable information output via the speaker 1445.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations may be made in the present disclosure without departing from the spirit or scope of the inventions. Thus, it is intended that the present disclosure covers the modifications and variations of this invention provided they come within the scope of the appended claims and their equivalents.

INDUSTRIAL APPLICABILITY

Although the method for measuring and reporting channel state information in the wireless communication system of the present invention has been described with reference to an example applied to a 3GPP LTE/LTE-A system or a 5G system, the method may be applied to various wireless communication systems in addition to the 3GPP LTE/LTE-A system or 5G system.

The invention claimed is:

1. A method for reporting, by a user equipment (UE), channel state information (CSI) in a wireless communication system, the method comprising:
receiving CSI configuration information related to a CSI reporting procedure, wherein the CSI configuration information includes information representing measurement setting for the CSI, information representing reporting setting for the CSI, and information representing resource setting for the CSI;
receiving one or more channel state information (CSI)-reference signals (CSI-RSs) based on the information representing the resource setting; and
reporting the CSI determined by measurement values estimated by the one or more CSI-RSs, based on the information representing the measurement setting and the information representing the reporting setting,
wherein first triggering for transmission of the one or more CSI-RSs and second triggering for reporting of the CSI are included in downlink control information,
wherein the one or more CSI-RSs belong to at least one CSI-RS resource setting included in the information representing the resource setting,
wherein the CSI is reported through one or more CSI reporting settings in CSI measurement setting included in the information representing the measurement setting, and
wherein, based on multiple CSI-RS resource settings being preconfigured as multiple links for the one or more CSI reporting settings, information representing ON or OFF for at least one link among the multiple links is included in the downlink control information.

2. The method of claim 1, wherein the first triggering and the second triggering are simultaneously indicated for the UE.

3. The method of claim 2, wherein the first triggering and the second triggering are indicated for the UE in the same slot.

4. The method of claim 1, wherein the first triggering and the second triggering are indicated through specific downlink control information, and
wherein the specific downlink control information includes a first field for the first triggering and a second field for the second triggering.

5. The method of claim 4, wherein the first field indicates indexes for one or more CSI-RS resources related to the first triggering, and
wherein the second field indicates indexes for one or more CSI-RS reporting settings related to the second triggering.

6. The method of claim 5, wherein the first triggering and the second triggering are indicated through specific downlink control information,
wherein the specific downlink control information includes flag information indicating the first triggering or the second triggering, and
wherein the indexes for one or more CSI-RS resources related to the first triggering or the indexes for one or more CSI reporting settings related to the second triggering are indicated in a common field included in the specific downlink control information.

7. The method of claim 6, wherein the flag information further indicates whether joint triggering between the first triggering and the second triggering is performed.

8. The method of claim 7, wherein indication information indicating the indexes for one or more CSI-RS resources related to the first triggering and the indexes for one or more CSI reporting settings related to the second triggering is configured to be indicated in the common field.

9. The method of claim 1, wherein the first triggering is indicated through first downlink control information including first field for the first triggering, and
wherein the second triggering is indicated through second downlink control information including second field for the second triggering.

10. The method of claim 1, wherein the information representing the measurement setting further includes information indicating a use of the at least one CSI-RS resource setting, and
wherein the use of the at least one CSI-RS resource setting is one of channel measurement, interference measurement, or rate matching.

11. The method of claim 10, wherein the information representing the measurement setting further includes swapping information changing the use of the at least one CSI-RS resource setting, and
wherein the use of the at least one CSI-RS resource setting is one of the channel measurement, the interference measurement, or the rate matching.

12. The method of claim 1, wherein the one or more CSI-RSs are configured to be aperiodically transmitted, and
wherein the CSI is configured to be aperiodically reported.

13. A user equipment (UE) configured to report channel state information (CSI) in a wireless communication system, the UE comprising:

a radio frequency (RF) module for transmitting and receiving a radio signal; and
a processor functionally connected with the RF module, wherein the processor is configured to control the UE to:
receive CSI configuration information related to a CSI reporting procedure, wherein the CSI configuration information includes information representing measurement setting for the CSI, information representing reporting setting for the CSI, and information representing resource setting for the CSI,
receive one or more channel state information (CSI)-reference signals (CSI-RSs) based on the information representing the resource setting, and
report the CSI determined by measurement values estimated by the one or more CSI-RSs, based on the information representing the measurement setting and the information representing the reporting setting, and
wherein first triggering for transmission of the one or more CSI-RSs and second triggering for reporting of the CSI are included in downlink control information,
wherein the one or more CSI-RSs belong to at least one CSI-RS resource setting included in the information representing the resource setting,
wherein the CSI is reported through one or more CSI reporting settings in CSI measurement setting included in the information representing the measurement setting, and
wherein, based on multiple CSI-RS resource settings being preconfigured as multiple links for the one or more CSI reporting settings, information representing ON or OFF for at least one link among the multiple links is included in the downlink control information.

* * * * *